United States Patent
Bamba

(10) Patent No.: US 9,621,452 B2
(45) Date of Patent: Apr. 11, 2017

(54) COMMUNICATION SYSTEM AND NODE

(71) Applicant: FUJITSU LIMITED, Kawasaki-shi, Kanagawa (JP)

(72) Inventor: Masakazu Bamba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 14/635,211

(22) Filed: Mar. 2, 2015

(65) Prior Publication Data
US 2015/0280975 A1    Oct. 1, 2015

(30) Foreign Application Priority Data

Mar. 25, 2014   (JP) ................................. 2014-062473

(51) Int. Cl.
*H04L 12/24*    (2006.01)
*H04L 12/707*    (2013.01)
*H04L 12/26*    (2006.01)

(52) U.S. Cl.
CPC .......... *H04L 45/22* (2013.01); *H04L 43/0811* (2013.01)

(58) Field of Classification Search
None
See application file for complete search history.

(56) References Cited

U.S. PATENT DOCUMENTS

| 2002/0114031 | A1 | 8/2002 | Yamada | |
| 2008/0068983 | A1* | 3/2008 | Dunbar | H04L 12/66 370/216 |
| 2010/0177631 | A1 | 7/2010 | Chen et al. | |
| 2010/0195535 | A1* | 8/2010 | Ziller | H04W 40/28 370/254 |
| 2012/0147742 | A1* | 6/2012 | Kitamori | H04L 12/2697 370/225 |
| 2014/0355424 | A1* | 12/2014 | Rao | H04J 14/0295 370/228 |

FOREIGN PATENT DOCUMENTS

| JP | 07-183889 | 7/1995 |
| JP | 2002-247038 | 8/2002 |
| JP | 2005-027144 | 1/2005 |
| JP | 2007-074314 | 3/2007 |
| JP | 2012-500539 | 1/2012 |

* cited by examiner

*Primary Examiner* — Eunsook Choi
(74) *Attorney, Agent, or Firm* — Fujitsu Patent Center

(57) ABSTRACT

A node positioned in a protection path for a working path stores identification information available to identify a source node and an end node. The identification information is contained in a signaling message transmitted to the end node through the protection path from the source node in order to set a usage reservation of the protection path. The node notifies the failure detection to an address identified by the stored identification information in response to a failure detection of the protection path.

12 Claims, 31 Drawing Sheets

FIG. 25

ASSOCIATION MANAGEMENT TABLE

| CONNECTION ID = TUNNEL ID | SOURCE IP ADDRESS | END IP ADDRESS |
|---|---|---|
| 0001 | 192.168.1.1 | 192.168.1.25 |
| 0002 | 192.168.1.1 | 192.168.1.19 |
| ... | ... | ... |
| 0104 | 192.168.1.18 | 192.168.1.60 |
| ... | ... | ... |

FIG. 26

TEST EXECUTION INFORMATION MANAGEMENT TABLE

| CONNECTION ID = TUNNEL ID | DATE(YYYYMMDDHHMM) |
|---|---|
| 0001 | 201309010824 |
| 0002 | 201309020901 |
| ... | ... |
| 0104 | 201312121935 |
| ... | ... |

202

COMMUNICATION SYSTEM AND NODE

CROSS-REFERENCE TO RELATED APPLICATION

This application is based upon and claims the benefit of priority of the prior Japanese Patent Application No. 2014-062473, filed on Mar. 25, 2014, the entire contents of which are incorporated herein by reference.

FIELD

The embodiments discussed herein are related to a communication system and a node.

BACKGROUND

From a viewpoint of an efficient operation of a network, there is a concept called a shared mesh network (SMN). In the SMN, a communication path is established through a desired communication node for connection without regard to a network topology such as a linear network (also referred to as an end-to-end network) or a ring network.

In the SMN, a technology called a shared mesh protection (SMP) may be used to achieve the efficiency of a protection line as well as a working line. The terms "working" and "protection" may be referred to as "active" and "standby", respectively. The term "line" may be referred to as a "path" or a "channel".

In the SMP, one protection path is used for (or shared by) a plurality of working path. Therefore, the SMP may be considered as a technology called a "1:N protection".

In a network before the SMN appears, there is a protection scheme such as a "1+1 protection", a "1:1 protection", or a "1:N protection". In the protection scheme, a path having the same condition as a working path is prepared as a "protection path".

Documents D1 to D5 listed below disclose an online test of a communication path in an LSP (Label Switched Path), a mesh network, and an ATM switch, and a technology relating to the 1:N protection in the mesh network.

D1: JP 2012-500539 T
D2: JP 2007-74314 A
D3: JP 2002-247038 A
D4: JP 7-183889 A
D5: JP 2005-27144 A

According to the technology disclosed in D1 to D5, it may be insufficient for a reliability (it may also be referred to as soundness or failure resistance) of a network (it may also be referred to as a communication system) in some cases.

SUMMARY

One aspect of a communication system may include: a source node and an end node of a working path; and an intermediate node positioned in a protection path for the working path. The intermediate node may be set a usage reservation of the protection path. The intermediate node may store identification information available to identify the source node and the end node. The identification information may be contained in a signaling message addressed to the end node. The signaling message may be transmitted from the source node to the end node by using the protection path to set the usage reservation. The intermediate node may notify, in response to a detection of a failure of the protection path, the failure to an address identified by the stored identification information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 25 is a diagram illustrating an example of an association management table stored in the node illustrated in FIGS. 5 and 6;

FIG. 26 is a diagram illustrating an example of a testing information management table stored in the node illustrated in FIGS. 5 and 6;

DESCRIPTION OF EMBODIMENTS

Figure 1:
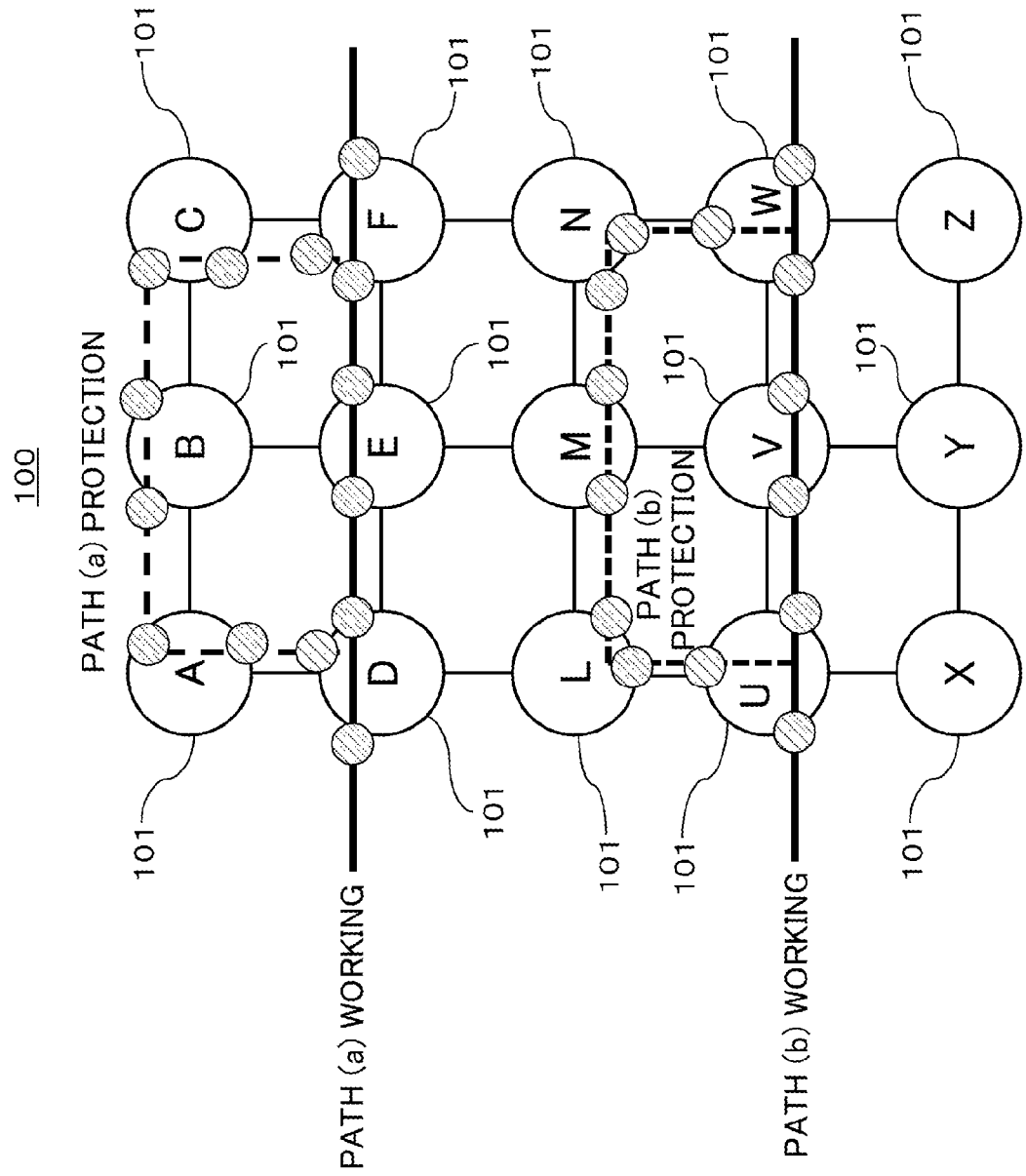
FIG. 1 is a diagram illustrating an exemplary configuration of a network for describing a 1+1 protection technology as an example of a protection technology.

Hereinafter, embodiments will be described with reference to the drawings. However, the following embodiments are given as merely exemplary, and it is not intended to exclude various modifications and various technical applications which are not explicitly described in the embodiments. Further, in the drawings used in the following embodiments, components denoted by the same symbols indicate the component identical with or similar thereto unless otherwise mentioned.

[1] Relation Between Protection Technology and SMN

FIG. 1 is a diagram illustrating an exemplary configuration (may also be referred to as a "topology") of a network for describing a 1+1 protection technology as an example of a protection technology. A network 100 illustrated in FIG. 1 may include a plurality of transmission apparatuses 101, for example.

The "transmission apparatus" is an example of a network element (NE) and may be referred to as a "communication apparatus", a "communication node", or simply a "node". In the example of FIG. 1, the network 100 include fifteen of nodes 101 indicated by A, B, C, D, E, F, L, M, N, U, V, W, X, Y, and Z. The respective nodes 101 may be connected in a mesh shape and configured to communicate to each other, for example. In other words, the respective nodes 101 may form an SMN 100.

In order to achieve the 1+1 protection in the network 100, one protection path is set for one working path. In the example of FIG. 1, a working path (a) is set on a route passing through the nodes D-E-F, and a protection path (a) for the working path (a) is set on a route different from the above route and passes through the nodes D-A-B-C-F. In addition, a working path (b) is set on a route passing through the nodes U-V-W, and a protection path (b) for the working path (b) is set on a route different from the above route and passes through the nodes U-L-M-N-W.

The "path" may be a "connection-oriented" path used in, for example, WDM (Wavelength Division Multiplexing) network, OTN (Optical Transport Network), SONET (Synchronous Optical NETwork), or SDH (Synchronous Digital Hierarchy) network.

In the 1+1 protection, the same wavelength, the same time slot (TS), and the same channel (hereinafter, these terms may be collectively referred to as a "communication resource" or simply a "resource") are not set (or assigned) for the communication of the working path and the protection path. For example, the same resource is not set to the working path (a) and the protection path (a), and also the same resource is not set to the working path (b) and the protection path (b).

Therefore, in both of the paths (a) and (b) for "working" and "protection", the resource is not overlapped (or shared) in the mid-section of the communication route. Furthermore, since it is preliminarily determined how the protection path is used, the protection path may be set to the same setting as that of the working path. For example, the protection path (a) may be set with the same setting as that of the working path (a), and the protection path (b) may be set with the same setting as that of the working path (b).

Figure 2:
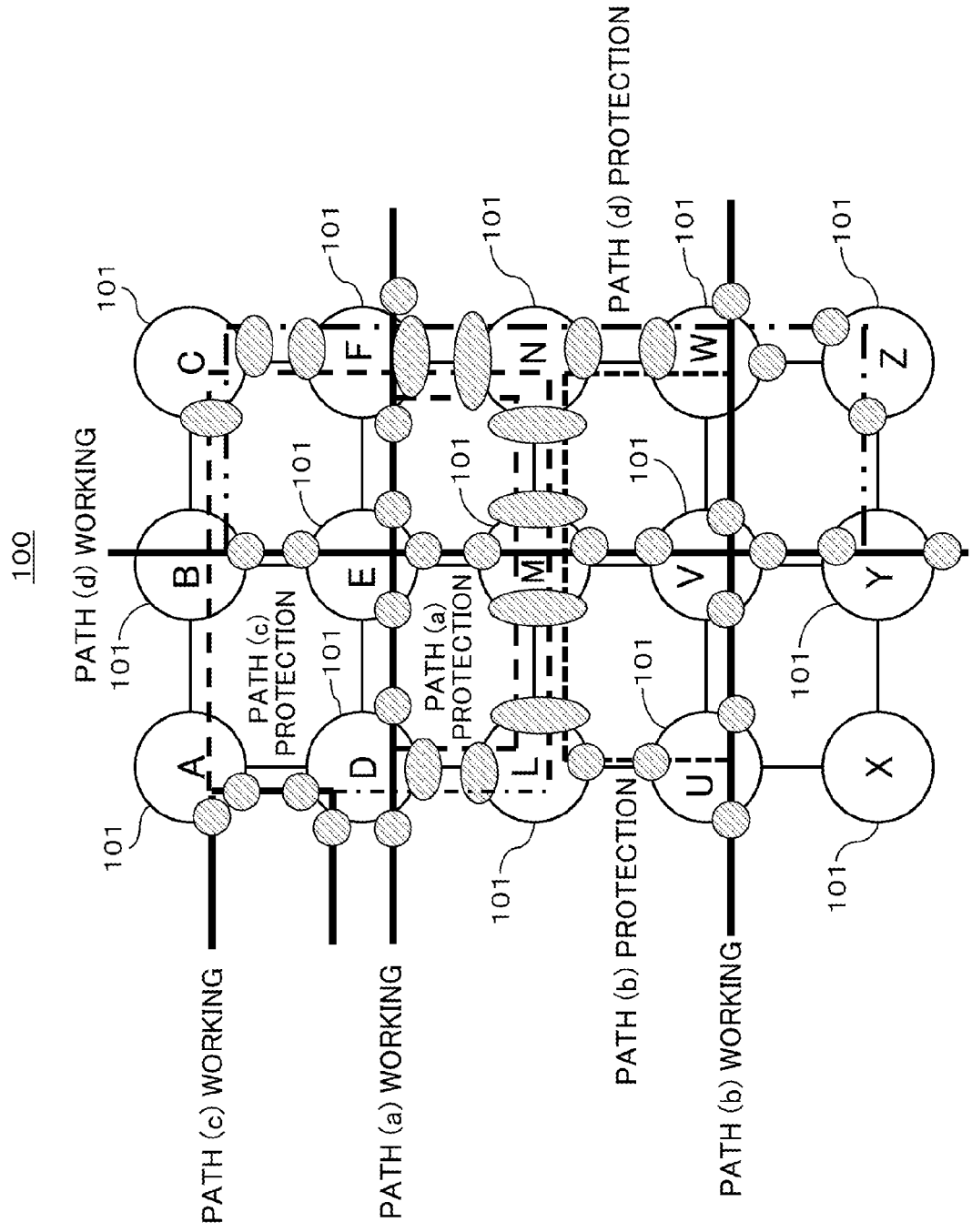
FIG. 2 is a diagram illustrating an example of path settings for an SMN in a network topology illustrated in FIG. 1.

On the other hand, FIG. 2 illustrates an example of path setting for the SMN in the network topology illustrated in FIG. 1. The example of FIG. 2 illustrates an aspect in which the protection paths (a) to (d) are set for four working paths (a) to (d), respectively.

For example, the protection path (a) set on a route passing through the nodes D-L-M-N-F is set for the working path (a) set on a route passing through the nodes D-E-F. In addition, the protection path (b) is set on a route passing through the nodes U-L-M-N-W for the working path (b) set on a route passing through the nodes U-V-W.

Further, the protection path (c) is set on a route passing through the nodes A-B-C-F-N-M-L-D for the working path (c) set on a route passing through the nodes A-D. In addition, the protection path (d) is set on a route passing through the nodes B-C-F-N-W-Z-Y for the working path (d) set on a route passing through the nodes B-E-M-V-Y.

In the example illustrated in FIG. 2, the working paths (a), (b), (c), and (d) are not overlapped in any of sections (hereinafter, may also be referred to as a "span") between one or a plurality of nodes 101. For example, the working path (a) passes through the nodes D-E-F, the working path (b) passes through the nodes U-V-W, the working path (c) passes through the nodes A-D, and the working path (d) passes through the nodes B-E-M-V-Y.

Therefore, the same resource (for example, the same wavelength) may be assigned to the respective working paths (a), (b), (c) and (d). A plurality of working paths may be set to one node 101. In the example of FIG. 2, two of working paths are set to each of the nodes D, E, and V.

Focusing on the node D, the working path (a) and the working path (c) are set to be overlapped. Focusing on the node E, the working path (a) and the working path (d) are set to be overlapped. Focusing on the node V, the working path (b) and the working path (d) are set to be overlapped.

In this way, even when the plurality of working paths are set to one node 101, it is possible to transmit a signal by using the same resource (for example, wavelength) to the respective working paths as long as the node is configured to separate the physical connection for every overlapped working path.

For example, upon focusing on the node D, as long as different optical fibers and different interfaces (see the hatched portions depicted in FIG. 2) are individually assigned for the working path (a) and the working path (c), the node D is possible to transmit the signal with the same wavelength to the respective working paths (a) and (c). This is also applied to the nodes E and V.

Meanwhile, there is a span (a fiber or an interface) in which the protection path is allowed to be overlapped with another protection path in order to achieve an efficient use of resource available in the network 100.

For example, in FIG. 2, the section of the nodes L-M-N is shared by three of the protection paths (a), (b), and (c) for three of the working paths (a), (b), and (c). In addition, the section of the nodes B-C-F is shared by two of the protection paths (c) and (d) for two of the working paths (c) and (d). Further, the section of the nodes D-L is shared by two of the protection paths (a) and (c) for two of the working paths (a) and (c). In addition, the section of the nodes F-N is shared by three of the protection paths (a), (c), and (d) for three of the working paths (a), (c), and (d).

According to the 1+1 protection (or a 1:1 protection), it is possible to uniquely identify that the protection path set (or reserved) to a certain span is scheduled to be used by which working path.

However, in the SMN, as described above, the protection paths shared by the plurality of working paths may be assigned to a certain span. For example, the protection paths (a), (b), and (c) for three of the working paths (a), (b), and (c) are assigned to the section of the nodes L-M-N depicted in FIG. 2.

In this case, for the purpose of the efficient us of the resource, the individual (or dedicated) resource is not assigned to the protection paths (a), (b), and (c). Alternatively, common resource for a single protection path shared by three of the working paths (a), (b), and (c) is assigned to the section of the nodes L-M-N. In other words, the single protection path set to the section of the nodes L-M-N is shared by three of the working paths (a), (b), and (c). Another span positioned in the plurality of protection paths is also the same as described above.

In such a case, the different resources are possibly assigned to a part or all of the plurality of working paths (a), (b), and (c). For example, an STS-3C starting from TS #1 is assigned to the working path (a), an STS-12C starting from TS #1 is assigned to the working path (b), and an STS-48C starting from TS #1 is assigned to the working path (c).

In other words, in the SMN, the protection path shared by the plurality of working paths is requested to support various kinds of working paths to which various kinds of resources are possibly assigned. Therefore, the protection path in the SMN is difficult to be preliminary scheduled (or expected) unlike the 1+1 protection or the 1:1 protection.

Therefore, in a case where a failure occurs in the working path in the SMN, after a kind of a working path to be relieved is determined (or identified) and after a kind of a protection path for the working path is set, a signal can be transmitted to the protection path. For example, in a case where a failure occurs in the working path (a) depicted in FIG. 2, after the kind of the working path (a) is determined, the setting for the protection path of the section of the nodes D-L-M-N-F is performed.

According to the procedure of setting the protection path after the failure occurrence (or detection) as described above, it is difficult to monitor a path state of the protection path unlike the 1+1 protection or the 1:1 protection in which the path state monitor is available. For example, in a case of SONET, it is unavailable to monitor an alarm signal of STS-1/-3C/-12C/-48C layers (hereinafter, may collectively be referred to as an "STS layer"). The term of "STS" is an abbreviation of "Synchronous Transport Signal", and "C" indicates the first letter of "concatenated".

Therefore, the failure of the STS layer for the protection path is not recognized until a switching to the protection path is actually performed in response to the failure detection of the working path. This means that there is a possibility unavailable to relieve the failure-occurred working path by the protection path in some cases.

It does not a matter whether the path setting to the protection path is performed on a higher layer than the STS layer (for example, an OC (Optical Carrier) layer in the SONET) and a physical layer (for example, an interface, an apparatus controller (CPU), a fan, and/or a power source). Therefore, it is available to detect a failure in the higher layer of the STS layer and/or the physical layer even in the SMN similarly to the 1+1 protection.

However, since the protection path in the 1+1 protection is set for only one working path, the nodes 101 positioned in the protection path is possible to uniquely determine which nodes 101 are the source and end nodes 101 of the working path for the protection path.

For example, in the example of FIG. 1, the source and end nodes 101 of the working path (a) are the nodes D and F, respectively. When a failure occurs in the protection path (a), the node A, B, or C is possible to identify that notification targets of failure information are the nodes D and F which are the source and end nodes 101 of the working path (a). Similarly, when a failure occurs in the protection path (b), the node L, M, or N is possible to identify that notification targets of failure information are the nodes U and W which are the source and end nodes 101 of the working path (b).

In contrast, in the SMN as illustrated in FIG. 2, the notification to the source and end nodes 101 of the failure information as described above is difficult. For example, it is assumed that a failure of an OC layer is detected at the nodes L and M due to an occurrence of a failure (for example, disconnection of the optical fiber) in an optical transmission line connected between the nodes L-M.

In this case, since the protection path between the nodes L-M is shared by three of the working paths (a) to (c), the nodes L and M are requested to notify a failure detection of the OC layer to the source and end nodes 101 for three of the working paths (a) to (c). For example, the nodes L and M are requested to notify the failure detection of the OC layer to all of: the source and end nodes D and F of the working path (a); the source and end nodes U and W of the working path (b); and the source and end nodes A and D of the working path (c).

However, unless the nodes L and M are available to uniquely identify that which working paths shares the protection path passing through the route in which the failure occurs, the nodes L and M are unavailable to notify the failure detection information of the OC layer to any of the source and end nodes 101 of any of the working paths.

Further, in order to avoid a situation where the failure of the protection path is not recognized until the switching to the protection path is actually performed in the SMN as described above, it is preferable to preliminarily test the protection path before performing the path switching (relieving) process (for example, during a normal operation). A technology available to autonomously and distributedly operate a network such as a network management system (NMS), a control plane, and a generalized multi-protocol label switching (GMPLS) protocol is applicable to the path test.

However, in a case where the number of test target paths is too many, the test process may be too much for the processing capability of the NMS. In the example of FIG. 2, when one hour is taken for the test per path, the test for all of four paths can be completed in four hours. However, when the number of test target paths in one network 100 is 10,000 or more, for example, since the test for one path takes one hour, the test for all of the paths would take 10,000 or more hours, that is, 400 or more days.

This means that the test may be performed only one time or less per year. Therefore, it is hard to say that the situation of detecting the failure for the first time after the switching to the protection path is completely avoided. In order to shorten the test time, it is considered that a plurality of paths are tested in parallel. For example, when 10,000 paths are tested in units of two paths in parallel, the test time can be reduced by half to 5,000 hours.

However, when the plurality of paths are tested in parallel, a conflict may occur between the tests. For example, in FIG. 2, when both of the working path (a) and the protection path (b) are tested in parallel, the test conflict occurs in the section of the nodes L-M-N. In this case, any one of tests is interrupted, and then the interrupted test will be performed all over again. As the number of paths to be tested in parallel is increased, the possibility of such a conflict would be increased.

In addition, the test conflict may occur not only in units of paths but also in units of spans. For example, a certain span of an end-to-end path may conflict with another path, and another span of the other path may conflict with still another path. In other words, when a certain span of the end-to-end path is shared by the different paths at the different locations, the complicated conflict of the path test easily occurs. Therefore, a conflict resolution process to avoid the conflict would also be complicated.

For example, in FIG. 2, when the protection path (d) is to be tested, there is a possibility to cause a conflict with a test for the protection path (c) in the span of the nodes B-C-F, and there is a possibility to cause a conflict with tests for the protection paths (a) and (c) in the span of the nodes F-N. Similarly, in the span of the nodes N-W, there is a possibility to cause a conflict between a test for the protection path (d) and a test for the protection path (b).

Hence, as long as a method available to control (or resolve) the conflict to reliably and efficiently test all of the protection paths is introduced, it is unavailable to secure the soundness in any of the protection paths.

In addition, the failure may occur in the working path during the test of the protection path, and thus, a request for switching from the working path to the protection path under the test may occur. For example, when a plurality of failures occur simultaneously in a plurality of working paths during a plurality of tests for a plurality of paths is performed in parallel by the NMS, the NMS may be requested to switch each of the failure-occurred working paths to the corresponding protection path under the test.

Hence, the NMS is requested to be able to arbitrate processes performed when the path switching is requested during the plurality of path tests in addition to the conflict of the path tests. However, the control by the NMS is complicated and it is hard to say that the control is realizable.

Therefore, it is considered that the path test is easily controlled using a GMPLS protocol which enables the NEs to be operable autonomously and distributedly rather than using the NMS to intensively control the path test. Hereinafter, the description will be made about an aspect that the NEs autonomously and distributedly confirm the soundness of the protection path by testing the protection path using the GMPLS protocol.

Figure 3:
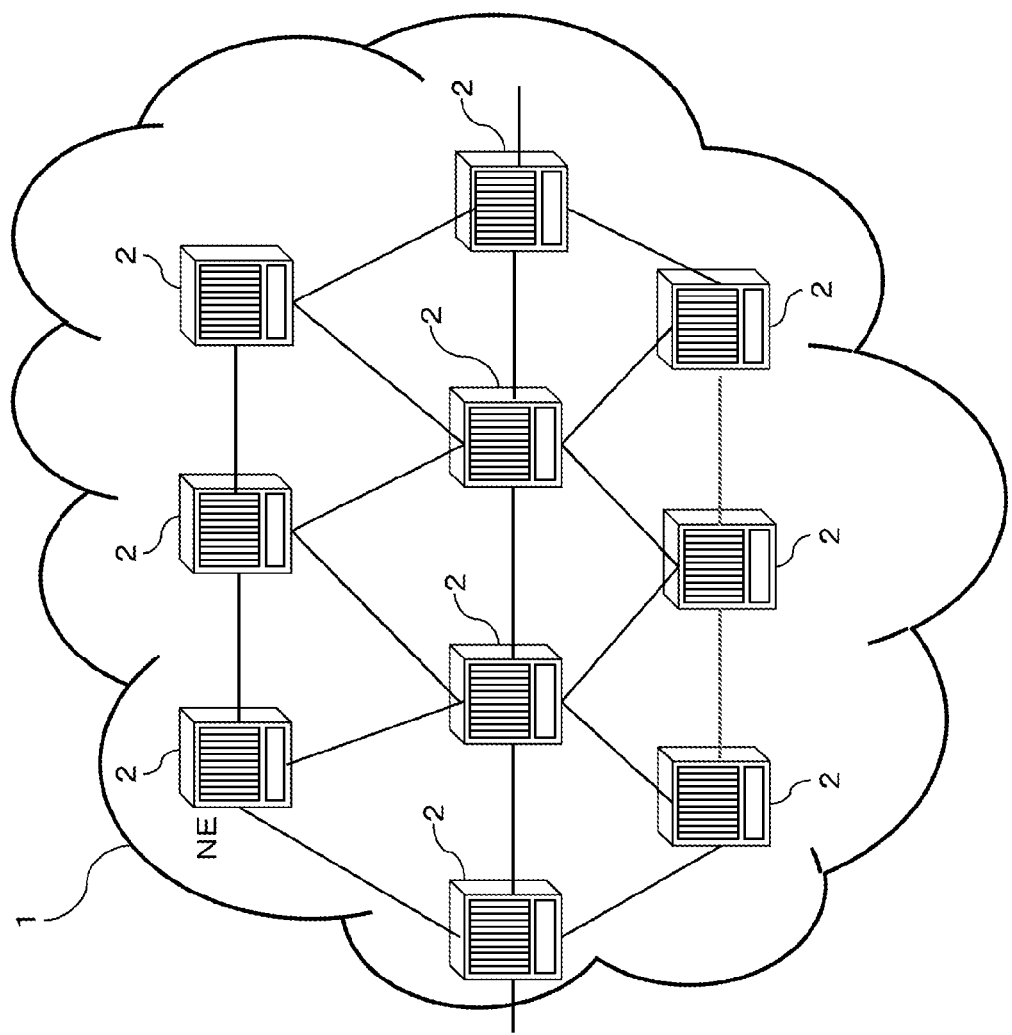
FIG. 3 is a diagram illustrating an exemplary configuration of a network according to an embodiment.
Figure 4:
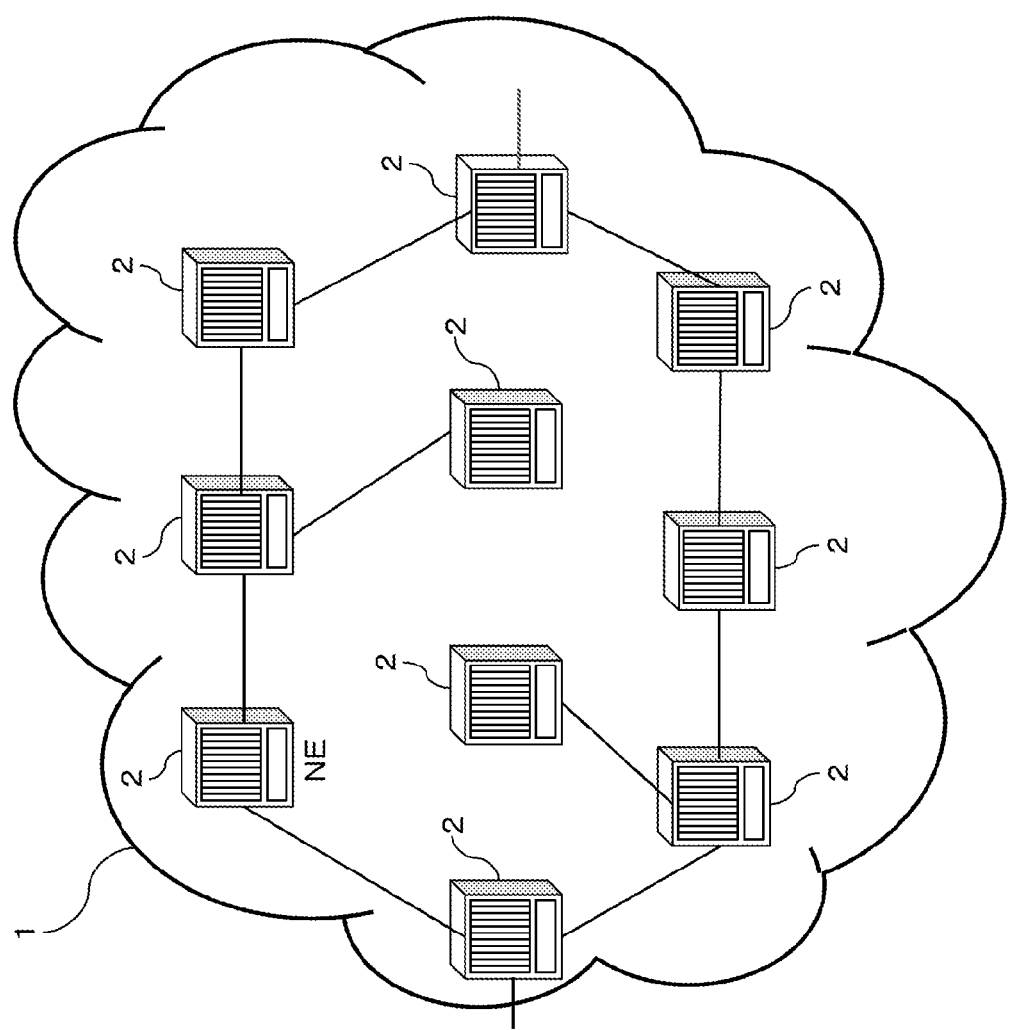
FIG. 4 is a diagram illustrating an exemplary configuration of a network according to an embodiment.

FIGS. 3 and 4 are diagrams illustrating an exemplary configuration of a network according to an embodiment. A network 1 illustrated in FIGS. 3 and 4 includes, for example, a plurality ("10" as a non-limiting example) of transmission apparatuses (hereinafter, may be referred to as "nodes") 2 as an example of the NEs.

FIG. 3 illustrates an exemplary connection (in other words, an example of a connection relation of data planes) between the nodes 2 upon focusing on a transmission route of a data signal (hereinafter, also referred to as a "main signal") in the network 1. In FIG. 3, the nodes 2 are connected in a mesh shape to form a mesh network (may also be referred to as a data plane network) 1.

Meanwhile, FIG. 4 illustrates an exemplary connection (in other words, an example of the connection relation of control planes) between the nodes 2 upon focusing on a transmission route of a control signal in the network 1. The control signal may be unnecessary to be transceived between all of the nodes 2 in the network 1 unlike the data signal. For example, as illustrated in FIG. 4, the connection may be established only between some of the nodes 2 available to transceive the control signal. The network 1 illustrated in FIG. 4 may be called a "control signal network 1", a "control plane network 1", or a "GMPLS network 1".

Figure 5:
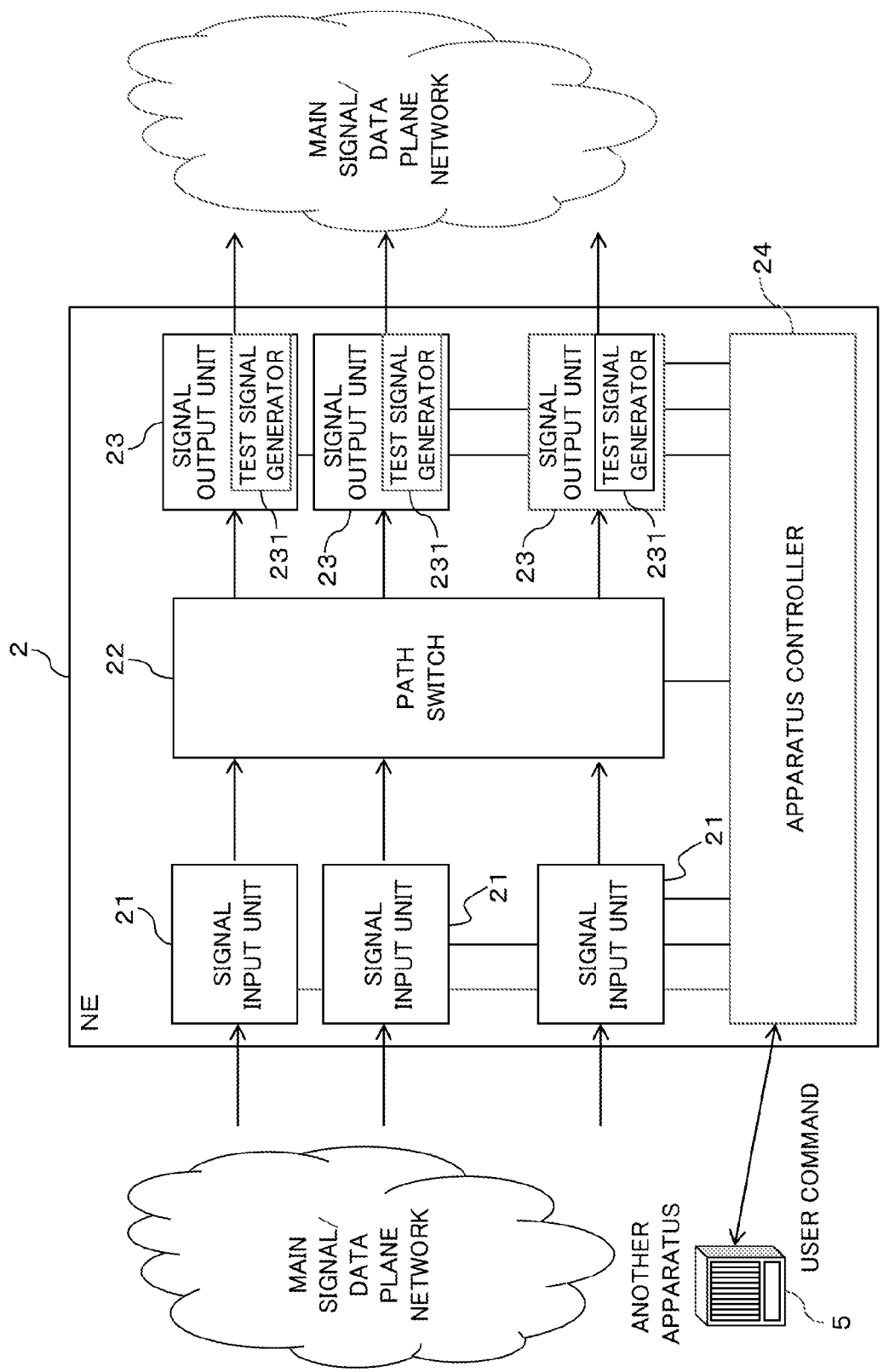
FIG. 5 is a block diagram illustrating an exemplary configuration of a transmission apparatus (node) depicted in FIGS. 3 and 4.

FIG. 5 illustrates an exemplary configuration of the node (NE) 2 illustrated in FIGS. 3 and 4. The NE 2 illustrated in FIG. 5 includes, for example, one or more of signal input units 21, a path switch 22, one or more of signal output units 23, and an apparatus controller 24.

The signal input unit 21 provides a communication interface for another NE 2 which may be an NE in a network different from the network 1 (the same shall apply hereinafter). For example, the signal input unit 21 receives a signal transmitted from the other NE 2. A non-limiting example of a reception signal may be a WDM signal or a frame signal used in the OTN, the SONET, or the SDH, for example. Each of the signal input units 21 may be configured depending on the type of the reception signal. Further, the signal input unit 21 may be called a signal receiver 21.

The signal output unit 23 provides a communication interface for the other NE 2 and transmits a signal to the other NE 2, for example. A non-limiting example of the transmission signal may be a WDM signal or a frame signal used in the OTN, the SONET, or the SDH. Each of the signal output units 23 may be configured depending on the type of the transmission signal. The transmission signal of the signal output unit 23 may be a test signal to be described below as an example of the control signal. Therefore, the signal output unit 23 may include a test signal generator 231. The signal output unit 23 may be called a signal transmitter 23.

The path switch 22 is available to selectively connect any one of the signal input units 21 and any one of the signal output units 23 in response to control from the apparatus controller 24 so as to switch the routes of the signal. The path switch 22 may be an optical switch for the WDM signal, or may be a time slot interchange (TSI) switch for the frame signal used in the OTN, the SONET, or the SDH. The path switch 22 may be called a switch fabric 22.

The apparatus controller 24 is operable to control the entire operation of the NE 2. The control may include a signal reception process by the signal input unit 21, a signal transmission process by the signal output unit 23, and a switch process by the path switch 22. The apparatus controller 24 may be configured by using, for example, a processor such as a CPU and a DSP having an arithmetic capability, or may be configured by an LSI or an FPGA.

As illustrated in FIG. 5, the apparatus controller 24 may be connected to a communication apparatus different from the NE 2, for example, connected to a terminal 5 used by a maintenance person (may also be referred to as an operator or a user) in charge of maintenance, operation, and management (OAM) of the network 1. The terminal 5 is available to give a predetermined command to the NE 2 individually and selectively, as needed, in response to an operation by the operator.

Figure 6:
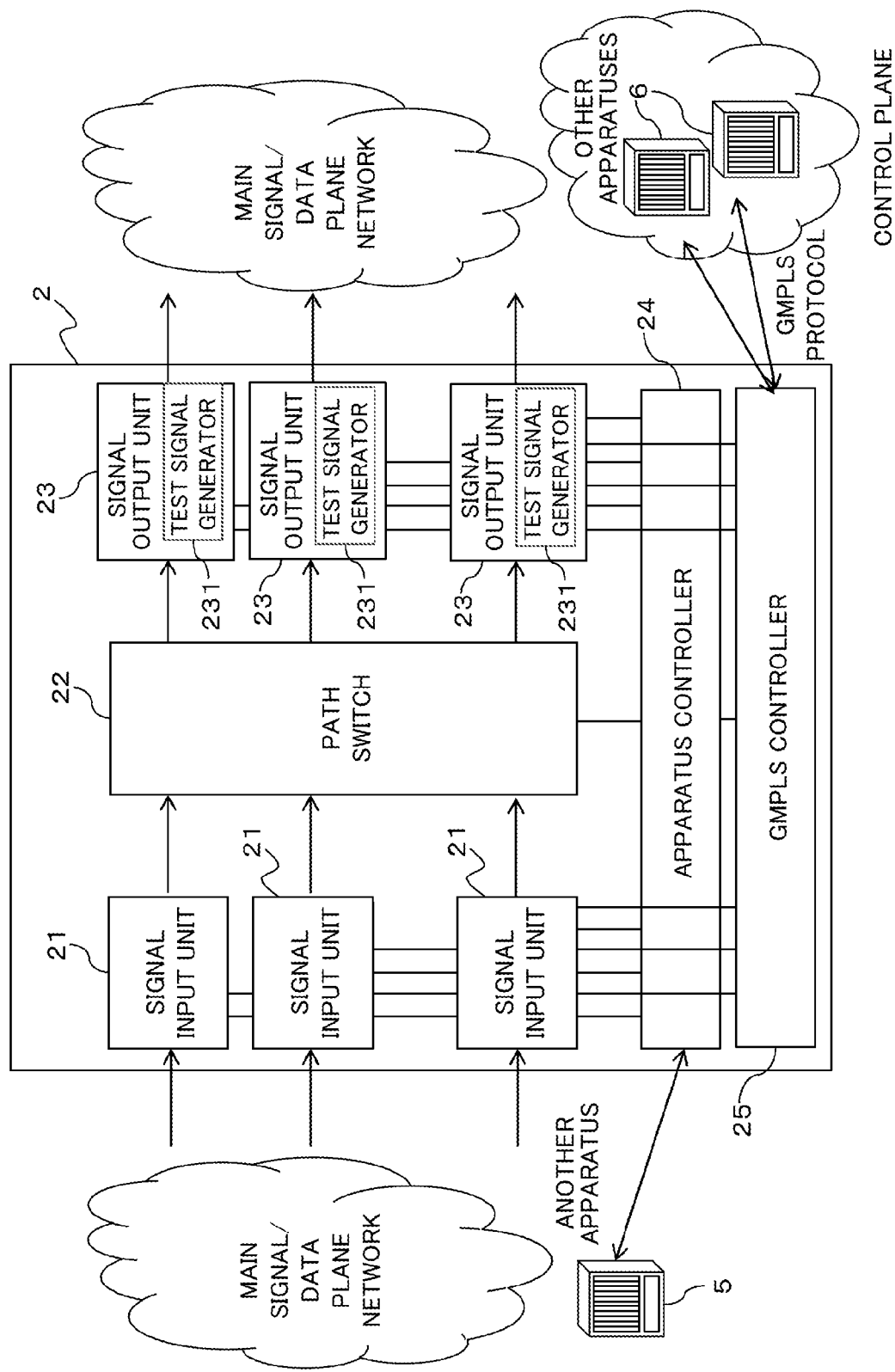
FIG. 6 is a block diagram illustrating a modification of the transmission apparatus (node) depicted in FIG. 5.

A function of processing the GMPLS protocol may be embedded in the apparatus controller 24, or, as illustrated in FIG. 6, may be achieved by a GMPLS controller 25 provided in the NE 2 separately from the apparatus controller 24. The GMPLS controller 25 may be connected to, for example, a communication apparatus 6 which is different from the NE 2 and is available to support the GMPLS protocol on the control plane. Similarly to the apparatus controller 24, the GMPLS controller 25 may be configured by using a processor such as a CPU and a DSP having an arithmetic capability, or may be configured by an LSI or an FPGA.

Figure 7:
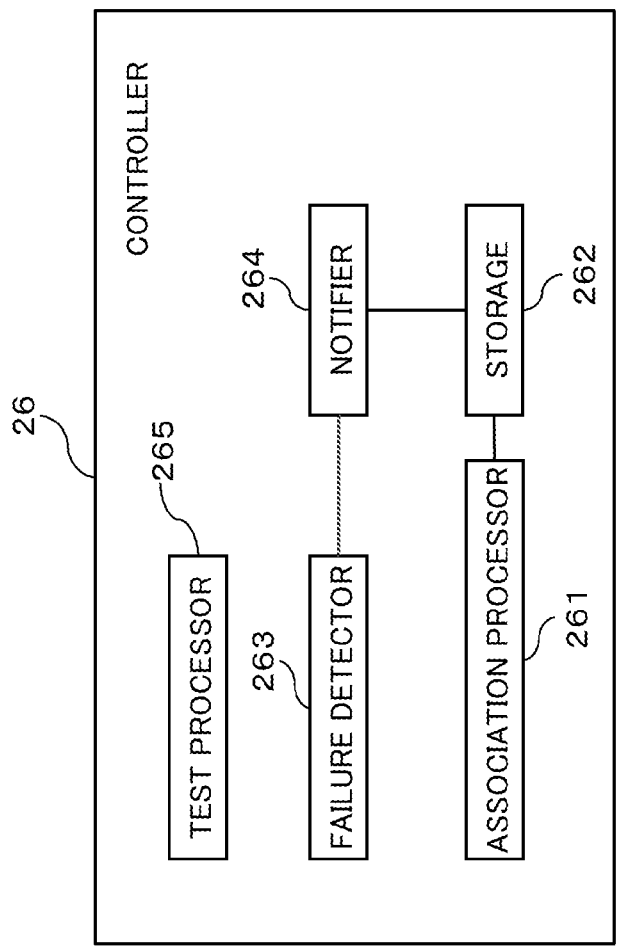
FIG. 7 is a block diagram illustrating an exemplary configuration focusing on functions of the transmission apparatus depicted in FIGS. 5 and 6.

As illustrated in FIG. 7, the apparatus controller 24 and the GMPLS controller 25 may be collectively called a "controller 26". Upon focusing on functional blocks of the controller 26, the controller 26 may include, for example, an association processor 261, a storage 262, a failure detector 263, a notifier 264, and a test processor 265.

As described later, the association processor 261 is operable to associate identifiers (IDs) of the source and end nodes 2 contained in a path message to be transmitted through the protection path in pre-signaling of the protection path with a resource set for a usage reservation for the protection path. The associated information may be stored in the storage 262.

The storage 262 stores the associated information, test execution information to be described later, a program (may also be referred to as software) and data used to control the entire operation of the node 2. The storage 262 may include a memory such as a RAM and a storage apparatus such as a hard disk. The processor having the arithmetic capability operates according to the program and the data read out from the storage 262 to achieve the functional blocks of the controller 26.

The failure detector 263 detects the failure of the protection path set with the usage reservation, for example, detects a state where a signal is not normally received due to a disconnection of the optical fiber serving as an optical transmission line.

In response to a detection of the failure of the protection path by the failure detector 263, the notifier 264 identifies the source and end nodes 2 of the protection path based on the associated information stored in the storage 262 and notifies the failure of the protection path to the identified address (hereinafter, may also be referred to as a "failure detection notification").

The test processor 265 executes a test to confirm the soundness of the protection path as described later.

The respective NEs 2 of the network 1 are operable to autonomously and distributedly execute a path setting, a path release, a path switching (or path relief), a path test, a conflict arbitration in the path test, and the like by using the GMPLS protocol. Examples of the GMPLS protocol may include routing protocols called a link management protocol (LMP), an open shortest path first with traffic engineering extensions (OSPF-TE), and a resource reservation protocol with traffic engineering extensions (RSVP-TE).

The RSVP-TE is an example of protocol available to perform signaling using a path message (Path Message) or a reserve message (Reserve Message). When two paths of the working path and the protection path are to be set, the signaling using a pair of the path message and the reserve message may be performed on each of two setting target paths. The signaling for the two paths may be performed in parallel, or may be sequentially performed.

Figure 8:
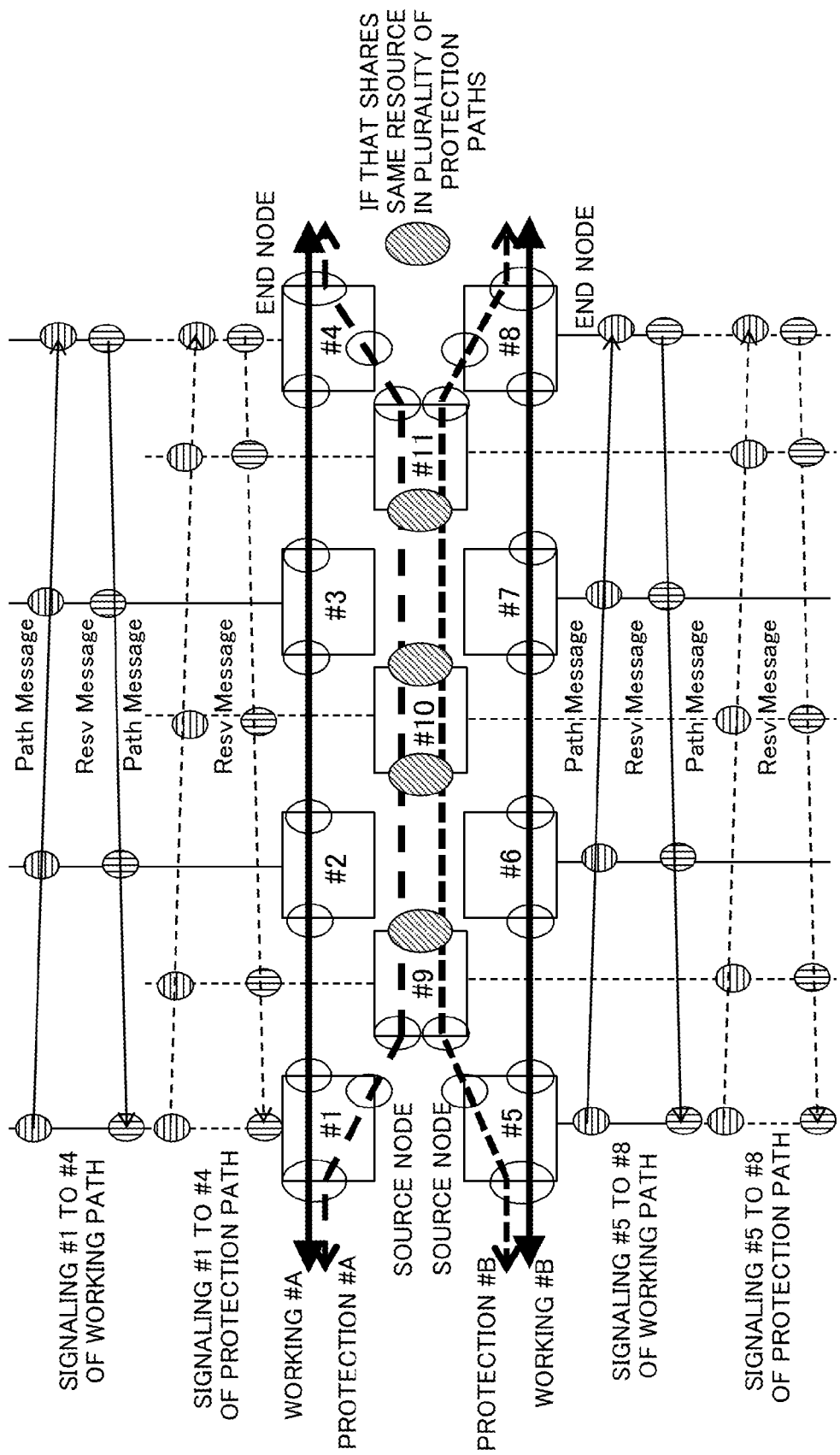
FIG. 8 is a diagram for describing a path setting procedure using an RSVP-TE protocol in the SMN.

An example of the signaling is illustrated in FIG. 8. In the example of FIG. 8, eleven network elements NE #1 to NE #11 are provided in the network 1. A first working path #A is set to a route passing through four network elements NE #1 to NE #4, and a second working path #B is set to a route passing through four network elements NE #5 to NE #8. In addition, the protection path #A (#B) shared with the working paths #A and #B is set to a route passing through three network elements NE #9 to NE #11.

In this case, the signaling is performed each of four paths of the (working) path #A, the protection path #A for the (working) path #A, the (working) path #B, and the protection path #B for the (working) path #B. Therefore, the signaling is performed four times in total.

For example, a source node #1 of the working path #A transmits the path message addressed to the end node NE #4 of the working path #A. The path message is transmitted to the end node #4 through the intermediate nodes #2 and #3 of the working path #A. In response to a reception of the path message, the respective nodes #2 to #4 perform a signal communication setting for the working path #A.

In response to a completion of the signal communication setting, the end node #4 of the working path #A transmits the reserve message addressed to the source node #1 as a response to the received path message. The reserve message is transferred to the source node #1 through the intermediate nodes #3 and #2. Upon receiving the reserve message, the source node #1 recognizes that the signal communication setting of the working path #A is successfully completed.

The signaling for the working path #B may be performed in a manner similar to the signaling for the working path #A. For example, the path message and the reserve message are transceived between a source node #5 and an end node #8 of the working path #B through intermediate nodes #6 and #7.

When the failure occurs in the working path #A (or #B) and thus the working path #A (or #B) is switched to the protection path #A (or #B), the signaling may also be performed on the protection path #A or #B in a manner similar to that for the working path #A or #B.

For example, in FIG. 8, when the failure occurs in the working path #A, the path message and the reserve message may be transceived between the source node #1 and the end node #4 of the protection path #A through intermediate nodes #9 to #11. Thereby, the signal communication setting for the protection path #A is performed on the respective nodes #1, #9, #10, #11, and #4 positioned in the protection path #A.

Similarly, when the failure occurs in the working path #B, the path message and the reserve message may be transceived between the source node #5 and the end node #8 of the protection path #B through the intermediate nodes #9 to #11. Thereby, the signal communication setting for the protection path #B is performed on the respective nodes #1, #9, #10, #11, and #4 positioned in the protection path #B.

Herein, in the example of FIG. 8, since NE #9 to NE #11 are shared by the protection path #A for the path #A and the protection path #B for the path #B, a scheme called a pre-signaling may be performed on the protection paths #A and #B, for example.

The pre-signaling may be used to assign (or reserve) the minimum requirement for resources to the protection path in a case where how the protection path is used is not determined yet. As described above, when the signal communication setting for the protection path is actually required due to an occurrence of a switching factor (or trigger) such as the failure, the signal communication setting for the protection path is performed by executing the signaling for the protection path again.

In the pre-signaling for the protection path, similarly to the signaling of the working path, the path message and the reserve message are transceived between the source and end nodes. For example, the path message and the reserve message are transceived between the source node #1 and the end node #4 of the protection path #A through the intermediate nodes #9 to #11. Similarly, the path message and the reserve message are transceived between the source node #5 and the end node #8 of the protection path #B through the intermediate nodes #9 to #11.

However, even when the path message transmitted by the source node #1 of the protection path #A is received by the respective setting target nodes #9, #10, #11, and #4 in the protection path #A, the respective nodes #9, #10, #11, and #4 are not necessary to perform the signal communication setting for the protection path #A. Instead, the respective nodes #9, #10, #11, and #4 may perform a reservation setting of the minimum requirement of resources for the protection path #A.

Similarly, even when the path message transmitted by the source node #5 of the protection path #B is received by the respective setting target nodes #9, #10, #11, and #8 in the protection path #B, the respective nodes #9, #10, #11, and #8 are not necessary to perform the signal communication setting of the protection path #A. Instead, the respective nodes #9, #10, #11, and #8 may perform the reservation setting of the minimum requirement of resources for the protection path #B.

Figure 11:
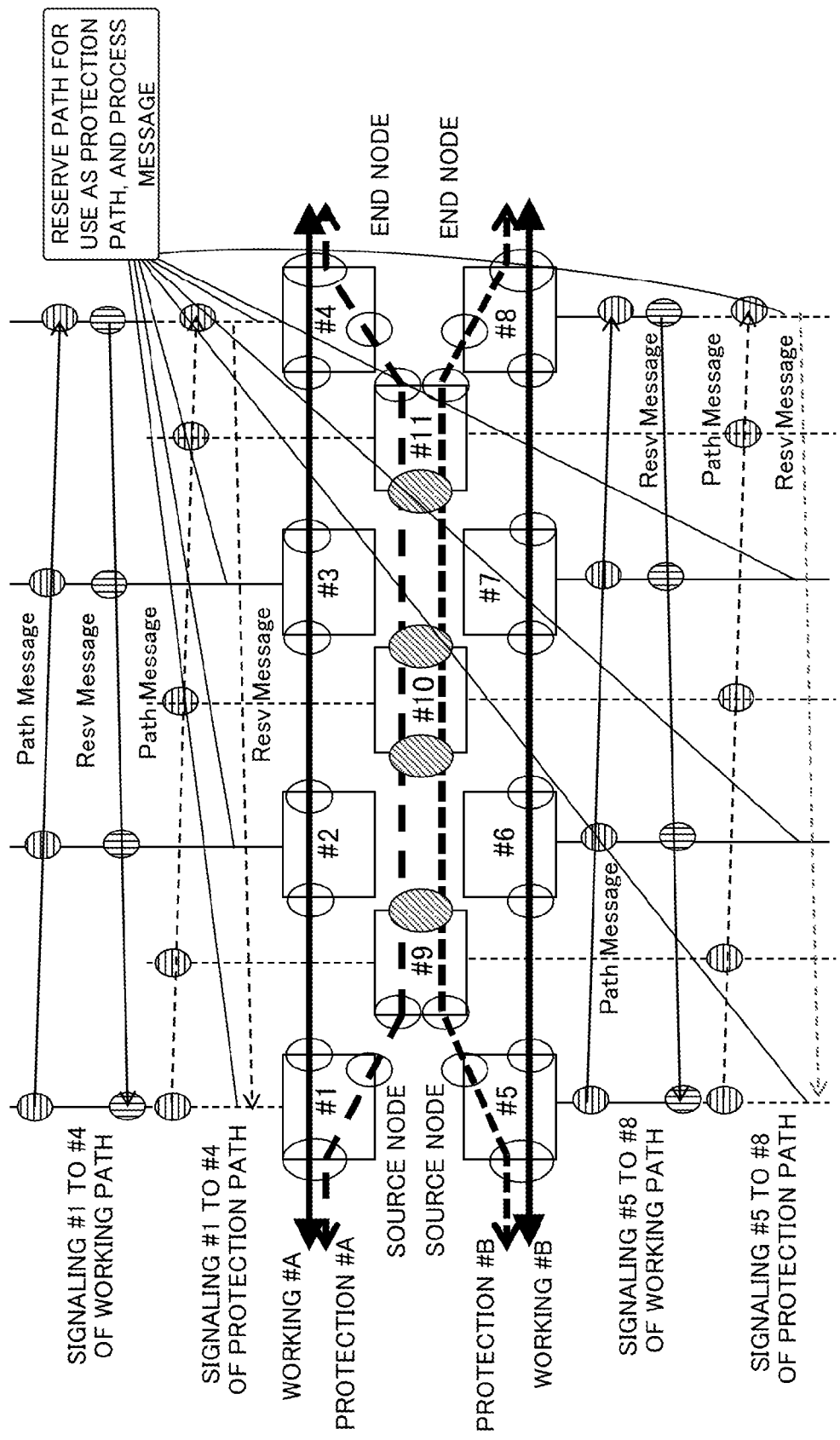
FIG. 11 is a diagram for describing a setting procedure of a usage reservation for a protection path by using the pre-signaling based on the RSVP-TE protocol in the SMN.

In other words, a node which receives the path message for the protection path may process the received reserve message and may set a state of the resource designated by the received path message to a state indicating that the resource is reserved for the protection path (see FIG. 11).

A pre-signaling message may be generated, for example, by the controller 26 illustrated in FIG. 7. The pre-signaling message is transceived through the signal input unit 21 and the signal output unit 23 illustrated in FIGS. 5 and 6. The signal input unit 21 may be served as an example of a receiver available to receive a signaling message addressed to the end node from the source node 2 through the protection path in order to set the usage reservation of the resource for the protection path.

Figure 9:
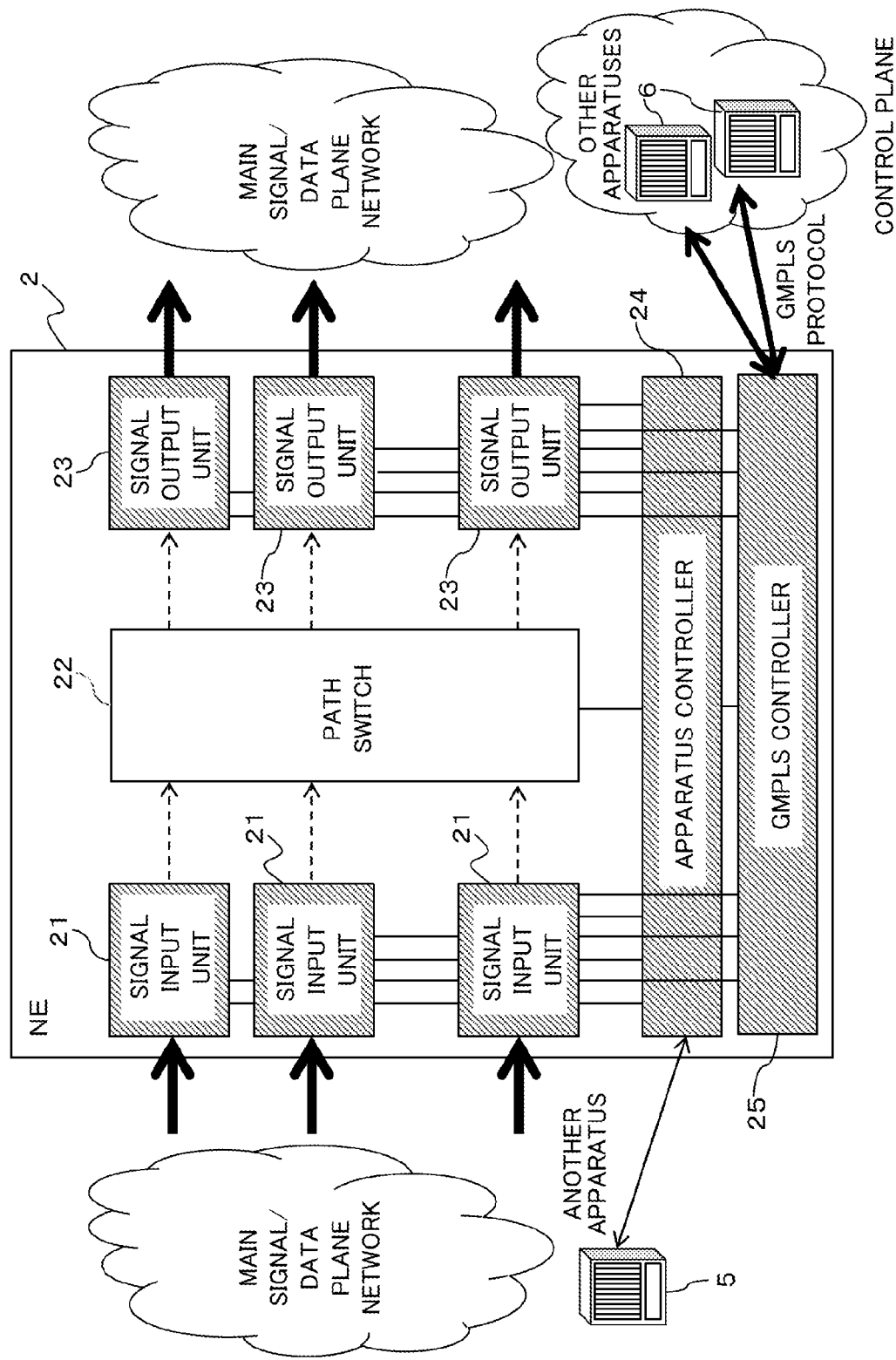
FIGS. 9 and 10 are diagrams illustrating a setting target range by pre-signaling in a node configuration depicted in FIG. 6.
Figure 10:
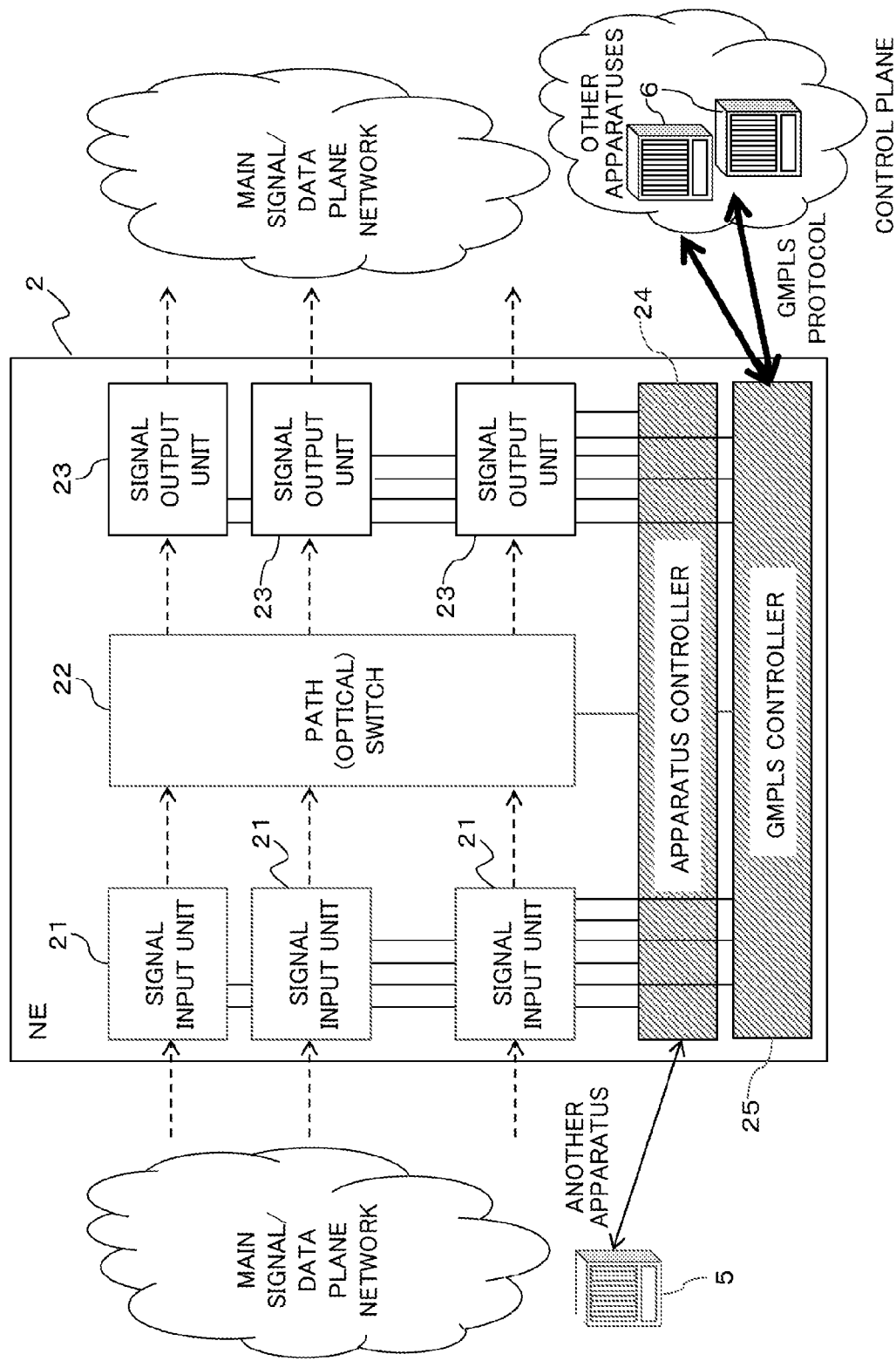

FIGS. 9 and 10 illustrate an example of a range (or target) in which the reservation is set by the pre-signaling in the configuration of the node 2 illustrated in FIG. 6. FIG. 9 illustrates the range of the reservation setting with the shaded portions in the node 2 which processes a main signal of a signal frame used in the OTN or the SONET. In other words, the range of the reservation setting illustrated in FIG. 9 indicates that the type of signal to be communicated upon occurring the switching factor (in other words, the type of resource of a reservation setting target) is the same in the protection path #A and the protection path #B. In a case where the type of resource is the same, the reservation setting may be performed on the signal input unit 21, the signal output unit 23, the apparatus controller 24, and the GMPLS controller 25 by the pre-signaling.

In contrast, FIG. 10 illustrates the range of the reservation setting with the shaded portions in a case where a different type of resource of the reservation setting is possibly assigned for the protection path #A and the protection path #B. For example, in an optical exchange, the characteristics of the signal light to be communicated in the protection path #A and the protection path #B are different each other. As an example, it may be considered that the signal lights communicated in the protection paths #A and #B have the same wavelength but are modulated by a different modulation schemes for the protection paths #A and #B.

As described above, in a case where a different type of resource of the reservation setting is possibly assigned for the protection path #A and the protection path #B, the signal input unit 21 and the signal output unit 23 may be excluded from the reservation setting target by the pre-signaling.

Further, in the signaling and the pre-signaling illustrated in FIGS. 8 and 11, the source node 2 transmits a path message in which information available to identify the source node 2, the end node 2, and a relaying route is set. The information may be set to an object (or field) defined in RFC (Requests For Comments) 3209, RFC 3471, and RFC 3473 which are standards of IETF (Internet Engineering Task Force).

Figure 30:
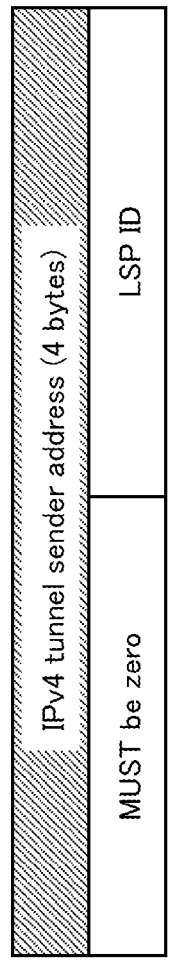
FIG. 30 is a diagram illustrating an exemplary format of an "LSP TUNNEL IPv4 Sender Template" object to which identifier of the source node in the embodiment is set.
Figure 31:
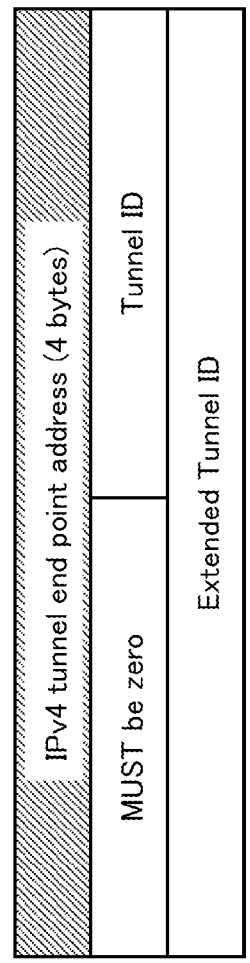
FIG. 31 is a diagram illustrating an exemplary format of an "LSP TUNNEL IPv4 Session" object to which identifier of the end node in the embodiment is set.

As a non-limiting example, an identifier of the source node 2 may be set to "IPv4 tunnel sender address" of an object (see FIG. 30) called "LSP TUNNEL IPv4 Sender Template". An identifier of the end node 2 may be set to "IPv4 tunnel end point address" of an object (see FIG. 31) called "LSP TUNNEL IPv4 Session". An identifier of the relay route (or repeater route) may be set to an object called "Explicit Route". Further, the relay route may be identified by using an identifier of the intermediate node (may also be referred to as a "relay node" or "repeater node") 2.

Address information such as an IP address used in the Internet protocol (IP) is applicable to the identifier. The above respective objects are used in a network which supports the Internet protocol version 4 (IPv4). However, the identifier may be set to the objects used in the Internet protocol version 6 (IPv6).

The intermediate node 2 being operable in accordance with the IETF standard is available to identify the next destination node (may also be referred to as a "next hop") 2 of the path message with reference to the "Explicit Route" object of the received path message. The "Explicit Route" object may manage a sub-object(s) indicative of an address (es) of one or more of relay nodes 2 positioned in the route toward the end node 2.

Therefore, the intermediate node 2 may extract the leading sub-object in the "Explicit Route" object, and may determine that the node 2 identified by the address set in the extracted sub-object is the next hop of the received path message.

Then, the intermediate node 2 regenerates the "Explicit Route" object, inserts (or sets) the "Explicit Route" object other than the sub-object corresponding to the determined next hop 2 into the received path message, and transfers the message to the determined next hop. According to the IETF standard such as RFC 3209, the relay node 2 needs not care about the source node 2 and the end node 2 in the process of the path message and the reserve message. Therefore, the relay node 2 needs not learn about which nodes 2 are the source and end nodes 2 of the path.

In the 1+1 protection technology of a non-SMN, the signal communication setting is performed on both of the working path and the protection path after the reserve message is processed. Since the signal communication setting for the protection path has been completed, even when the failure occurs in the protection path, the source and end nodes of the protection path are available to detect the occurrence of the failure.

Figure 12:
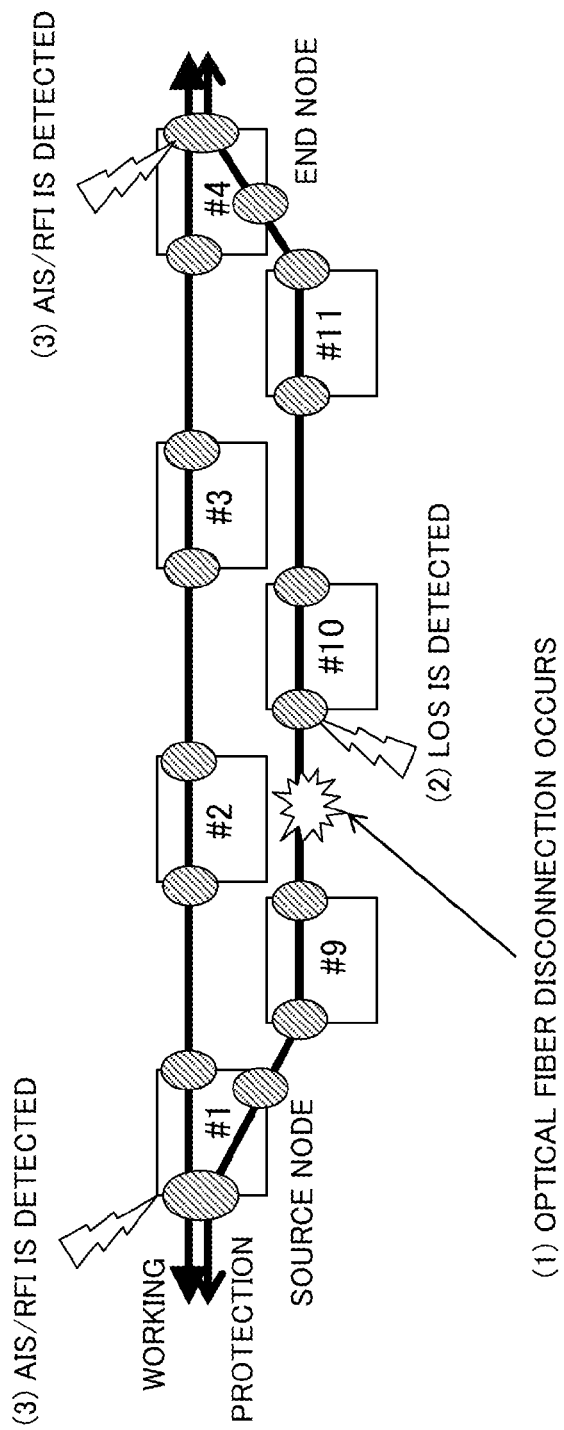
FIG. 12 is a diagram for describing an operation example in a case where a failure occurs in a protection path in a non-SMN.

For example, as illustrated in FIG. 12, in the non-SMN, for example, it is assumed that the optical transmission line of the optical fiber in which the signal light is transmitted in a downstream direction is disconnected between the node #9 and the node #10. In this case, a loss of signal (LOS) for the downstream direction (direction toward the end node #4) is detected at the node #10, for example.

In response to the detection of the LOS, the node #10 notifies the failure occurrence in the data plane to the source node #1 and the end node #4 by using an RFI (Remote Failure Indication) or an alarm signal such as AIS (Alarm Indication Signal) of the main signal, which corresponds to the detected LOS. For example, the intermediate node #10 transmits the alarm signal to the source node #1 through an optical transmission line for an upstream direction. In addition, the intermediate node #10 transmits the alarm signal to the end node #10 through the optical transmission line in the downstream direction. Therefore, both of the source node #1 and the end node #4 are available to detect the failure occurrence of the protection path.

Figure 13:
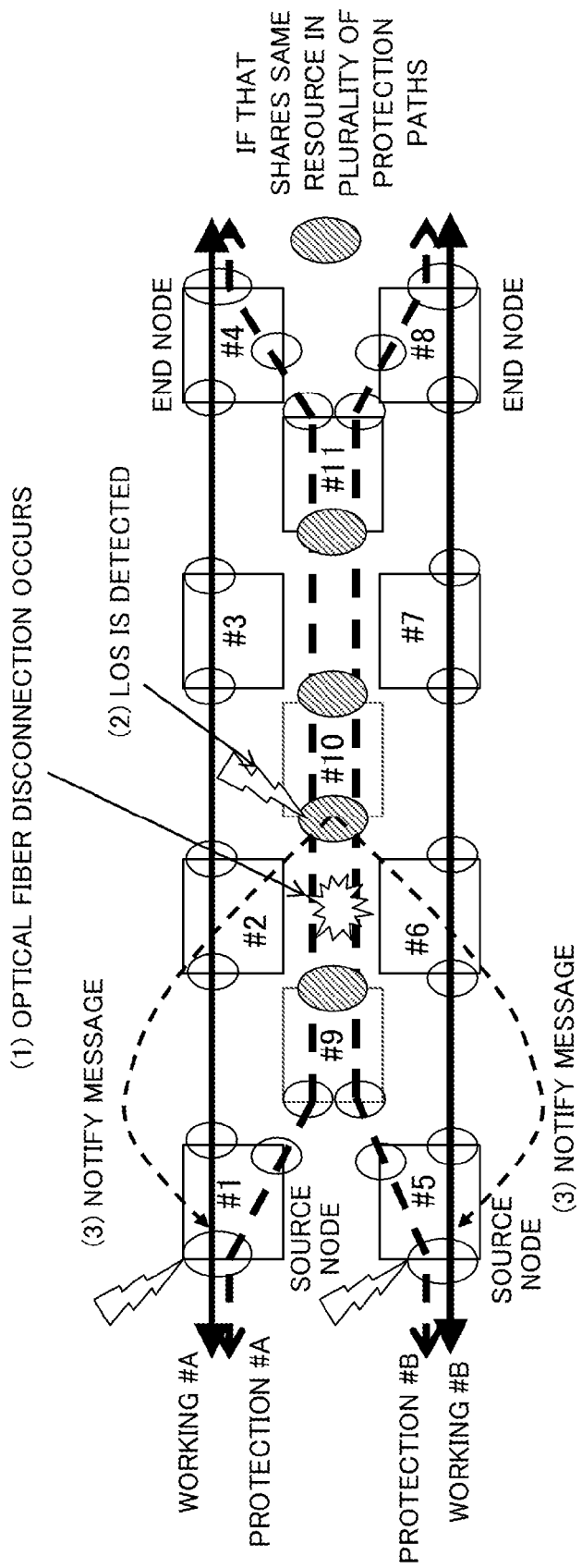
FIG. 13 is a diagram for describing an operation example in a case where a failure occurs in a protection path in the SMN.

On the contrary to the non-SMN, in the SMN, the reservation setting of the resource has been performed in the node 2 positioned in the protection path by using the pre-signaling but the signal communication setting has not yet been completed. Therefore, the node 2 is unavailable to identify the failure occurrence of the protection path and also unavailable to notify the failure occurrence to the source and end nodes 2. For example, as illustrated in FIG. 13, it is assumed that the protection path #A of the working path #A and the protection path #B of the working path #B are shared by the nodes #9, #10, and #11.

In this case, as described in FIGS. 9 and 10, the signal communication setting for the protection paths #A and #B has not yet been completed. In this state, for example, even when the optical transmission line between the nodes #9 and #10 is disconnected and the LOS is detected by the node #10, the node #10 is unavailable to transmit the alarm signal corresponding to the detected LOS to the source node #1 and the end node #4 by using the data plane.

With regard to the control plane and the GMPLS protocol, the RFC 3473 of the IETF standard defines, for example, a scheme available to transceive a message called a "notify message" between any nodes.

However, according to the protocol compliant to the IETF standard such as RFC 3209, RFC 3471, and RFC 3473, the intermediate node 2 does not need to manage (or care about, or learn about) information (for example, the identifier such as the IP address) on the source and end nodes 2.

Therefore, as illustrated in FIG. 12, even when the failure occurrence is detected by the intermediate node #10, the intermediate node #10 is not available to identify the destination address nodes (the source and end nodes) 2 of the notify message. Hence, the intermediate node #10 is not available to transmit the notify message. In other words, the SMN has no way (or means) to notify information "a state where the protection path is not available" because the failure occurrence of the protection path has been detected by the intermediate node #10 to the source node (and the end node).

(Failure Detection Notification)

Figure 14:
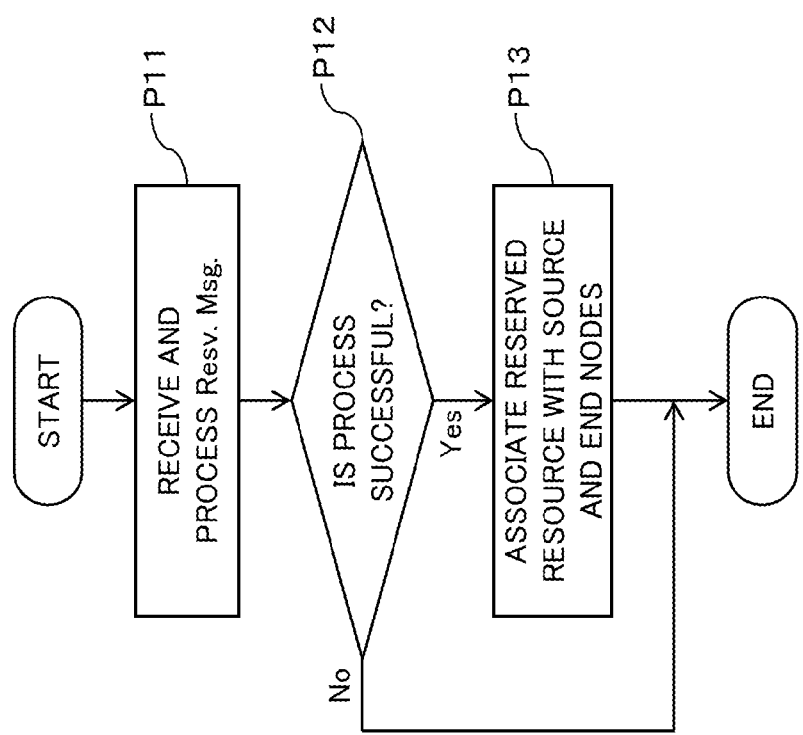
FIG. 14 is a flowchart for describing an example of an association process in a node (an intermediate node) positioned in the protection path according to the embodiment.

In the present embodiment, in order to make it possible to notify the failure information detected by the intermediate node 2 to the source and end nodes 2 in the SMN, for example, a process (an association process) illustrated in the flowchart of FIG. 14 may be performed in the intermediate node 2 at a stage (or a phase) of the pre-signaling for the protection path. The association process may be performed by the association processor 261 illustrated in FIG. 7.

In addition, upon detecting the failure occurrence in the intermediate node (hereinafter, may also be referred to as a "failure detection node") 2, the failure detection node 2 may perform, for example, a process (for example, the failure detection notification) illustrated in the flowchart of FIG. 14. The failure detection notification may be performed by the notifier 264 illustrated in FIG. 7.

As described above, according to the GMPLS protocol, in the pre-signaling, the intermediate node 2 determines the next hop of the path message with reference to the "Explicit Route" object of the received path message.

In the present embodiment, upon processing the path message, the intermediate node 2 may associate the identifiers of the source and end nodes 2 contained in the path message with the resource set for the reservation according to the reception of the path message are associated and may store the associated information in the intermediate node 2.

FIG. 25 illustrates an example in which the associated information is stored and managed as data in a table format (may also be referred to as an "association management table"). In the association management table 201 illustrated in FIG. 25, for example, the IP address of the source node 2 and the IP address of the end node 2 are associated and stored for management in a unit of connection identifier (ID) of the protection path of which the resource is set for the reservation. The connection ID may be equivalent to a tunnel ID.

For example, the association process is depicted by process P11, Yes route of the process P12, and process P13 in FIG. 14. When the reception process of the path message is failed, the intermediate node 2 may end the process without performing the association process (No route of process P12). The information subjected to the above association process may be referred to as the "associated information".

In a case where the RSVP-TE is used for the pre-signaling, the identifier of the source node 2, which is an information element of the associated information, may be an address set in "LSP_TUNNEL_IPv4 Sender Template" of the received path message. In addition, the identifier of the end node may be an address set in "LSP_TUNNEL_IPv4 Session" of the path message.

Figure 15:
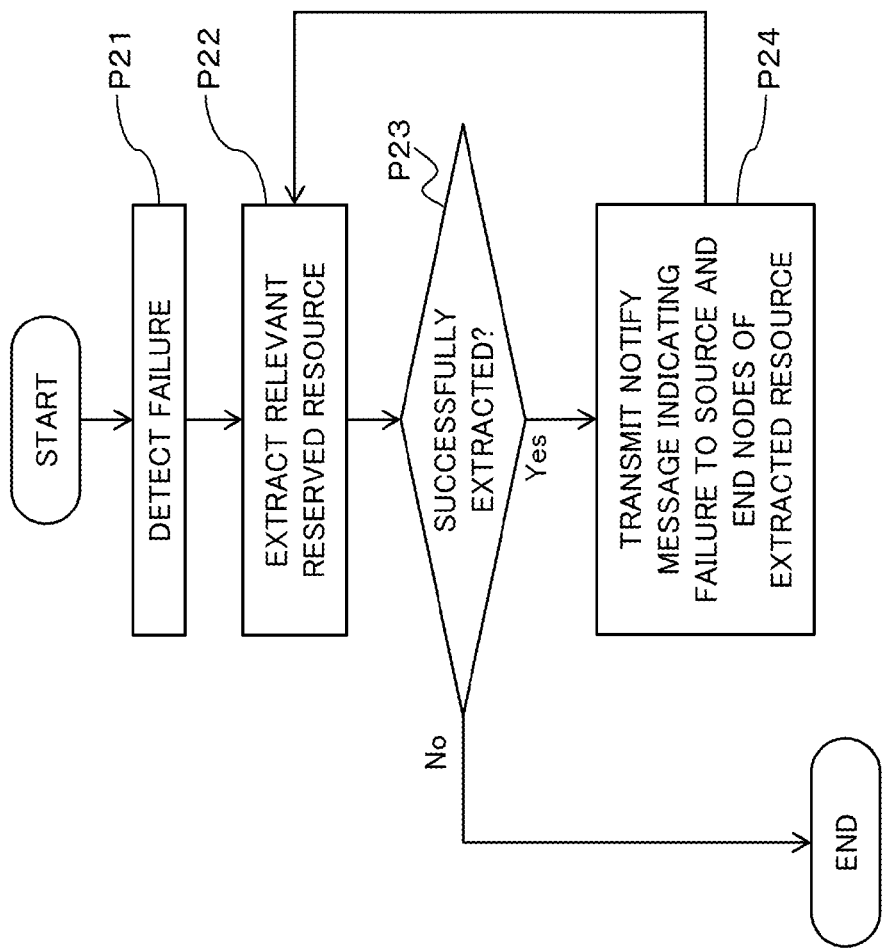
FIG. 15 is a flowchart for describing an example of a failure notification process performed by the intermediate node of the protection path according to the embodiment.

As illustrated in FIG. 15, upon detecting the failure in the reserved resource (process P21), the intermediate node 2 identifies (or extracts) the resource (process P22) and refers to the associated information using the identified resource as a key.

Then, the failure detection node 2 acquires the identifiers of the source and end nodes 2 corresponding to the identified resource from the associated information. The failure detection node 2 generates notify messages addressed to the source and end nodes 2 including the acquired identifiers as address information, and transmits the generated notify messages to the source and end nodes 2, respectively (Yes route of process P23 to process P24).

Figure 29:
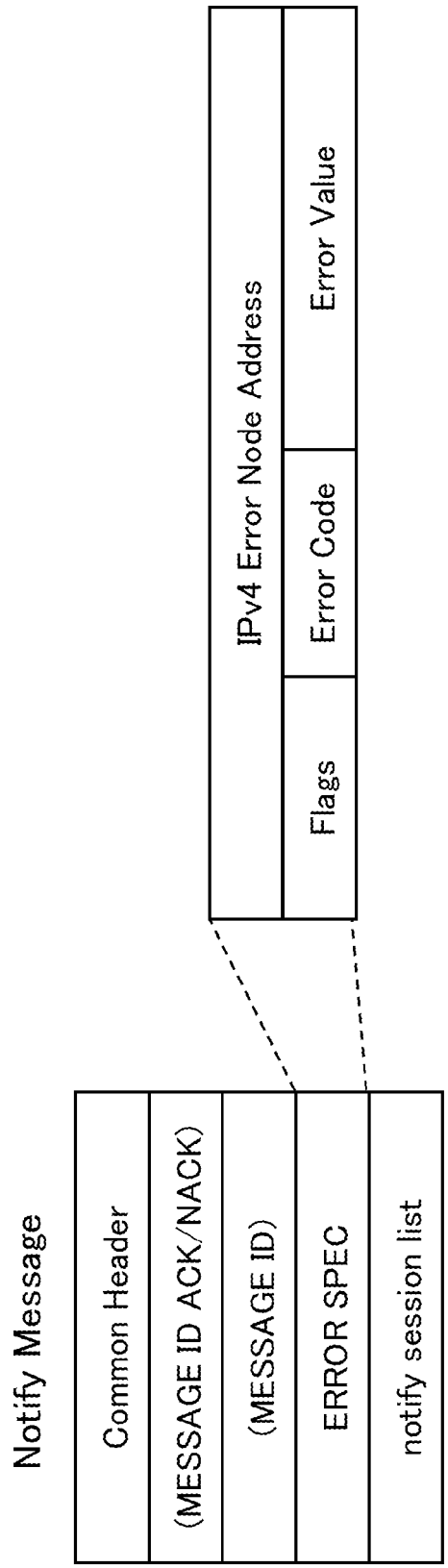
FIG. 29 is a diagram illustrating an exemplary format of a notify message used in the embodiment.

As illustrated in FIG. 29, the notify message may be a message in which a value (for example, an "Error Code") stored (or set) in an "ERROR SPEC" object (which is one of objects attached to the notify message as defined in RFC 3209 and RFC 3474).

For example, "Error Code" may be set to one (=1) to indicate the occurrence of the failure (Admission Control Failure). Alternatively, "Error Code" may be set to 33 (User Error Spec) to indicate that the failure information stored in the "ERROR SPEC" object is user-defined information, and detail information on a user-defined failure may be stored in the "ERROR SPEC" object.

By using the above-mentioned notify message, it is available to notify failure detection information to the source and end nodes 2 of the path reserved for using the failure-detected resource. In a case where the resource is not available to be extracted in process P22 (No in process P23), the failure detection node 2 may end the process without transmitting the notify message.

There is a possibility that one resource is shared by a plurality of protection paths in the node #9 and the node #10, for example, as illustrated in FIG. 13. In such a case, the failure detection node 2 repeats the identification (or extraction) process for all of the resources reserved for the plurality of protection paths. The destination addresses of the notify message are the addresses of the source and end nodes 2 of all the paths for which the same resource is reserved.

The source node 2 (for example, nodes #1 and #5 of FIG. 13) which received the notify message may perform a process (for example, a protection path re-setting process) as described later with reference to the flowchart of FIG. 24. For example, the source node 2 may determine whether the protection path is to be re-set according to a failure content (or failure type) indicated by the received notify message.

For example, when the failure type indicates a physical failure such as a disconnection of the optical fiber, it would take time to recover the failure. Therefore, the source node 2 may determine that it is better to re-set the protection path.

Meanwhile, when it is possible to determine that the failure content indicates a temporal failure caused by a restart of the node 2 due to a CPU restart, the source node 2 may determine that the re-setting of the protection path is not necessary.

Figure 24:
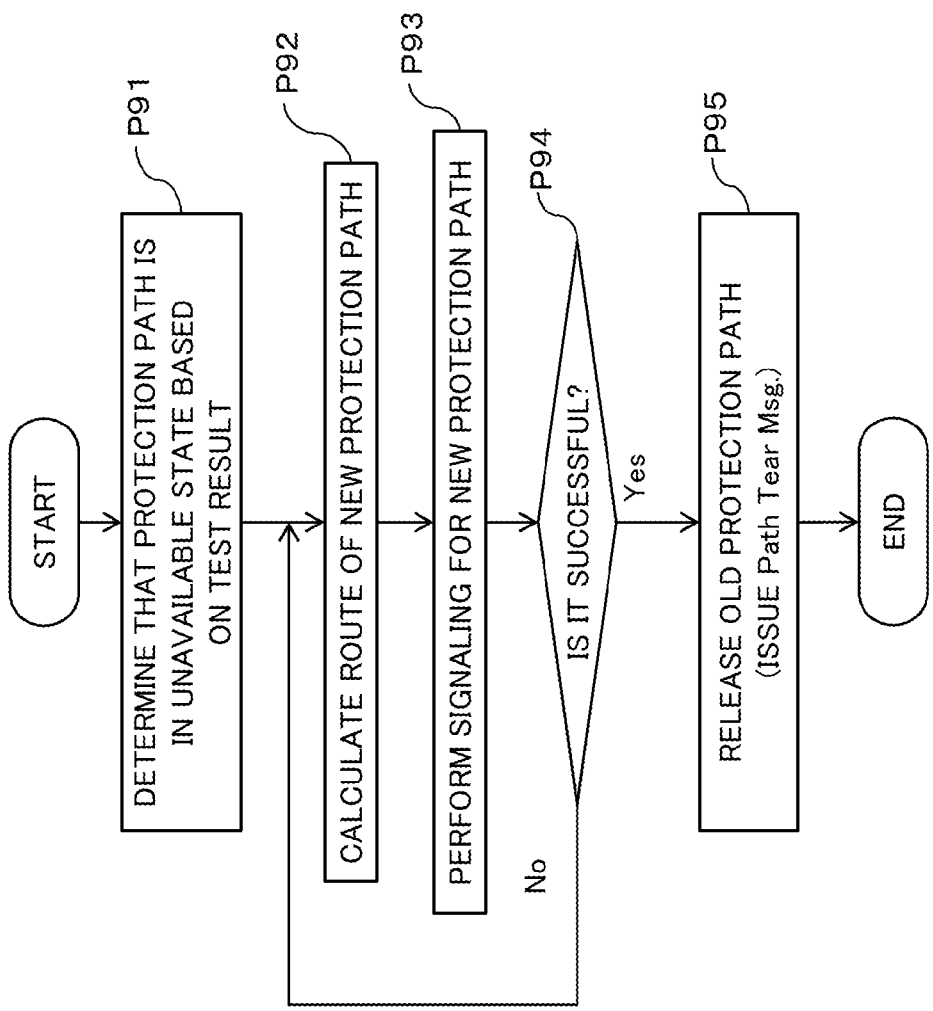
FIG. 24 is a flowchart for describing an operation example of the source node in a case where the source node of the protection path detects a failure of a working path according to the embodiment.

The process illustrated in FIG. 24 may be performed by the controller 26 illustrated in FIG. 7.

(Protection Path Test)

As described above, in a case where the failure is detectable at a stage of the pre-signaling, the failure detection notification can be given to the source and end nodes 2. Hence, the source and end nodes 2 is available to confirm whether or not the failure occurs in the protection path.

However, there may be a case (or state) where the notify message is not available to be transmitted to the source and end nodes 2. For example, there may be a case where a signal quality of a path has been degraded to a concerned level but the level would not cause the failure. Also, there may be a case (or state) where an unexpected event occurs in the shared protection path. In these cases, the source and end nodes 2 are not available to confirm (or identify) the above state (hereinafter, may also be referred to as a "quasi-failure state").

Therefore, in the present embodiment, as described below, for example, the test may be periodically performed on the protection path to ensure the soundness of the protection path. The test of the protection path may be performed according to the flowchart of FIG. 16, for example. The process (a protection path test process) illustrated in the flowchart of FIG. 16 may be performed in the source node 2 (for example, performed by the test processor 265 illustrated in FIG. 7), for example.

Figure 16:
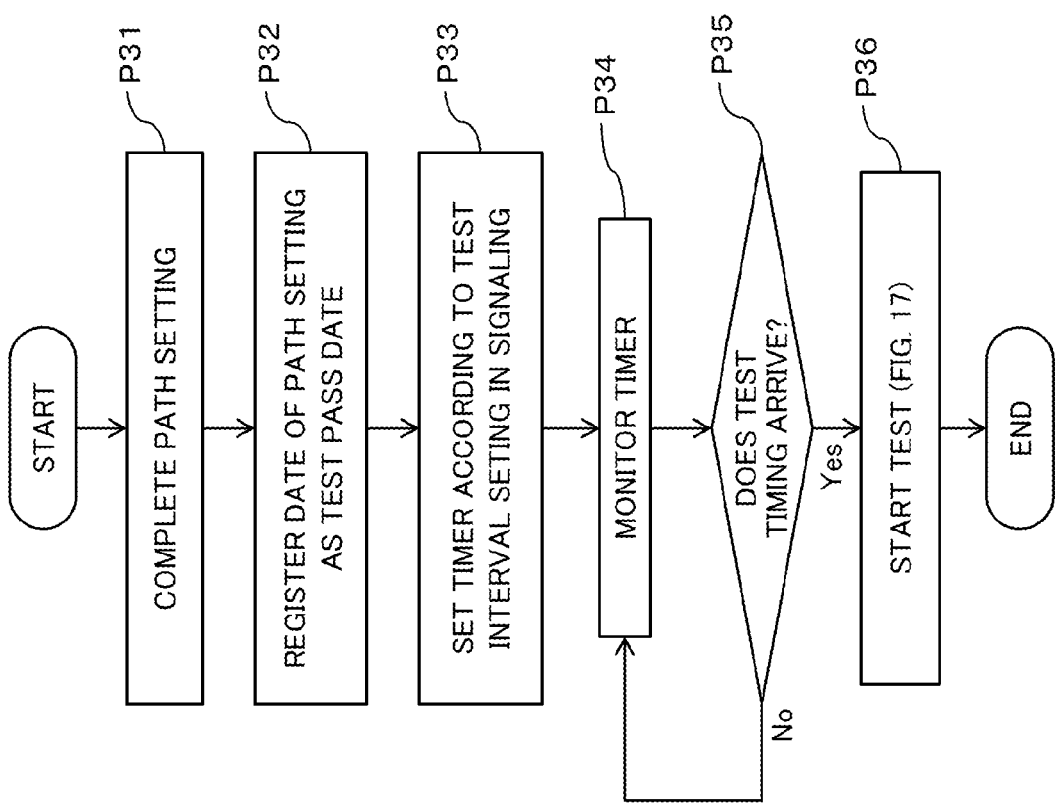
FIG. 16 is a flowchart for describing an example of a test process for the protection path according to the embodiment.

As illustrated in FIG. 16, the source node 2 performs the pre-signaling on the protection path as described above to carry out the path setting (a resource reservation setting) for the protection path (process P31). When the path setting of the protection path by the pre-signaling succeeds, the source node 2 stores (or registers) information indicative of an execution date of the path setting as information indicative of a test pass date (process P32).

The information indicative of the execution date (the test pass date) may be, for example, date information indicative of year, month, date, and hour. The date information may be stored as the test execution information, for example, in the storage 262 illustrated in FIG. 7. FIG. 26 illustrates an example in which the test execution information is stored as data in a table format (may also be referred to as a "test information management table"), for example. In a test information management table 202 illustrated in FIG. 26, for example, year (YYYY), month (MM), date (DD), hour (HH), and minute (MM) of the test pass date are stored and managed for each connection ID (or tunnel ID) of the protection path.

Thereafter, the source node 2 sets a test activation timer which counts time according to timing or period (or interval) at which the soundness of the protection path is desired to be confirmed (process P33). The test activation timer may be achieved as a function of the apparatus controller 24 or the GMPLS controller 25, for example. The source node 2 monitors the test activation timer (process P34 and No route of process P35), and activates (or starts) the test process for the protection path in response to a detection of timeout of the test activation timer as a trigger (Yes route of process P35 to process P36).

Figure 17:
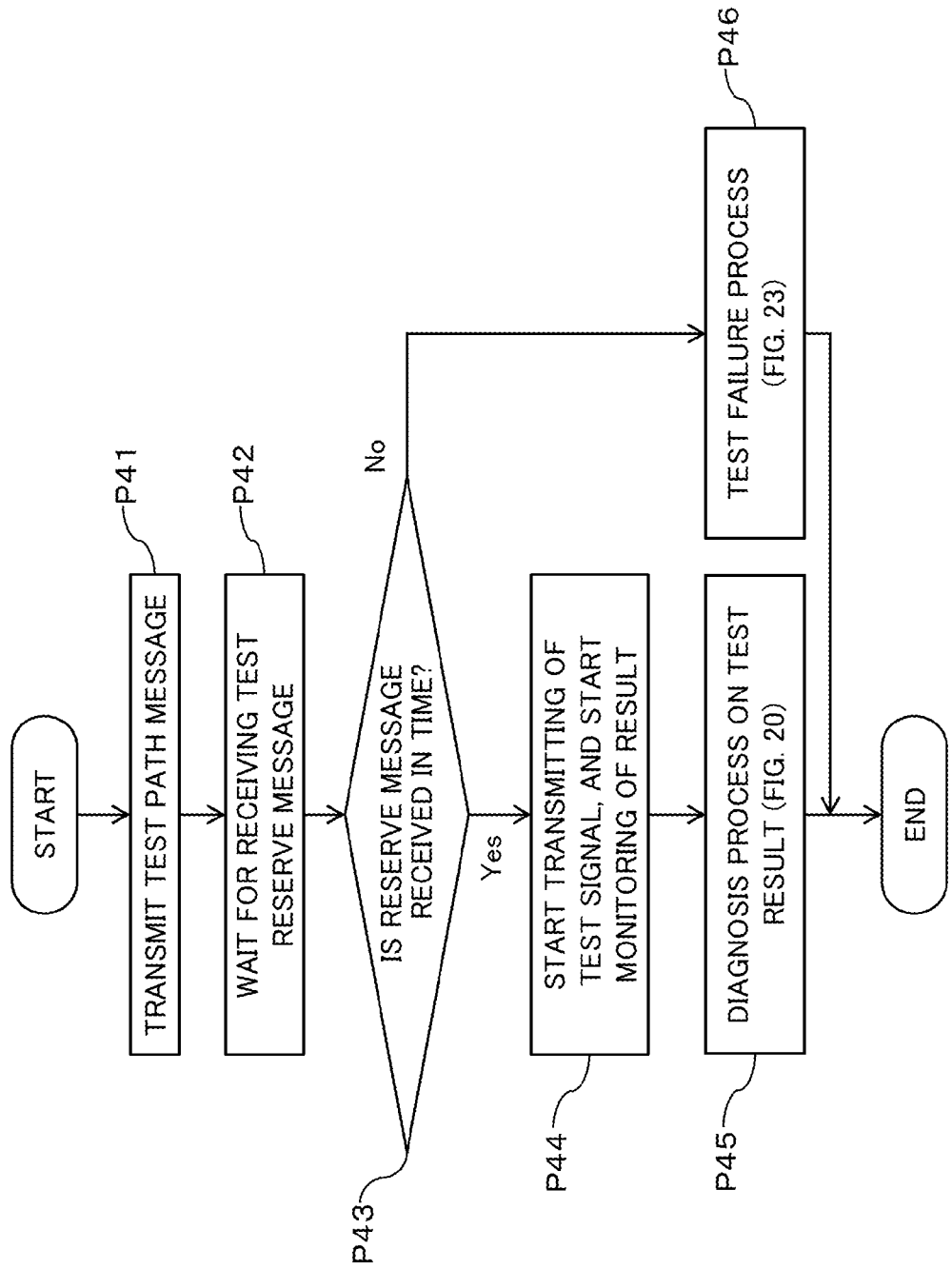
FIG. 17 is a flowchart for describing an example of a test process for the protection path in a source node of the protection path according to the embodiment.

The test process for the protection path may be performed according to the flowchart illustrated in FIG. 17. For example, the source node 2 transceives the path message and the reserve message through the protection path by the pre-signaling in accordance with the IETF standard. After the reserve message of the pre-signaling is received, the source node 2 transceives a signal (hereinafter, may also be referred to as a "test start signal") indicative of the test start and a response signal (hereinafter, may also be referred to as a "test start response signal") through the protection path.

A path message which includes information indicative of the test start (hereinafter, may also be referred to as a "test path message") is applicable to the test start signal, for example. Meanwhile, a reserve message which includes information indicative of the test start response (hereinafter, may also be referred to as a "test reserve message") is applicable to the test start response signal.

The test path message may be generated in the source node 2, and the test reserve message may be generated in the end node 2. The test path message and the test reserve message may be generated by the apparatus controller 24 or the GMPLS controller 25 of the node 2.

Further, the testing path message may include, for example, information indicative of "Test start instruction", "During Testing", and "Test cancel instruction" (may also be referred to as flag information) and information indicative of "Date and time of previous test". These sets of information may be referred to as attribute information of the path message.

Figure 27:
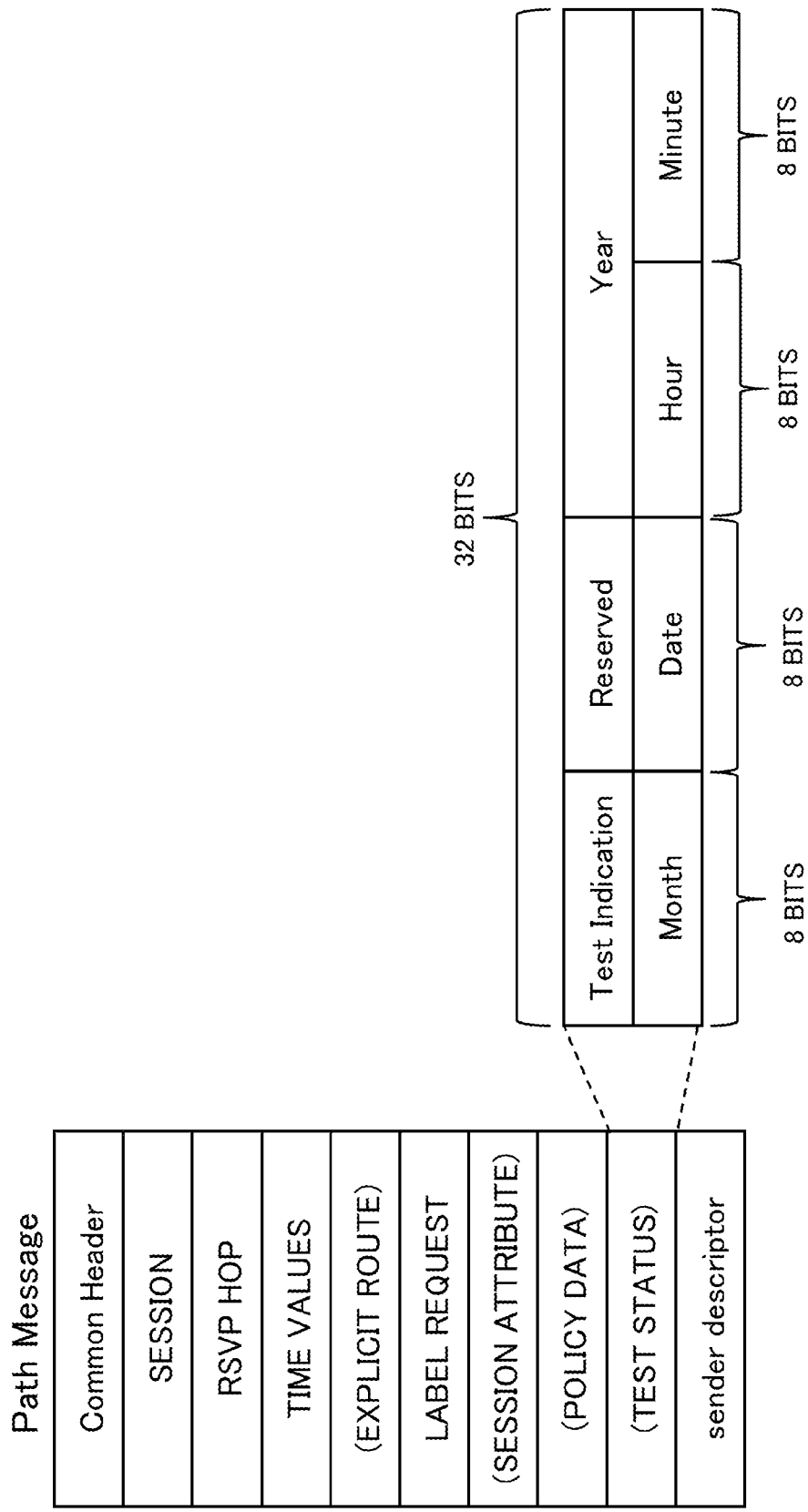
FIG. 27 is a diagram illustrating an exemplary format of a path message used in the embodiment.

The attribute information may be set as one of the objects (for example, an option object) attached to the path message defined in RFC 3209 and RFC 3474. For example, a new object of "TEST STATUS" may be defined as illustrated in FIG. 27, and the flag information (Test Indication) of the test and/or the information indicative of the test execution date (year, month, date, hour, and minute; for example, 17:41 on Sep. 15, 2013) may be set to the newly-defined "TEST STATUS" object. "Test Indication" may be set to indicate "ON" (test start instruction or during testing) by "0" and "OFF" (test cancel instruction or non-test period) by "1".

Figure 28:
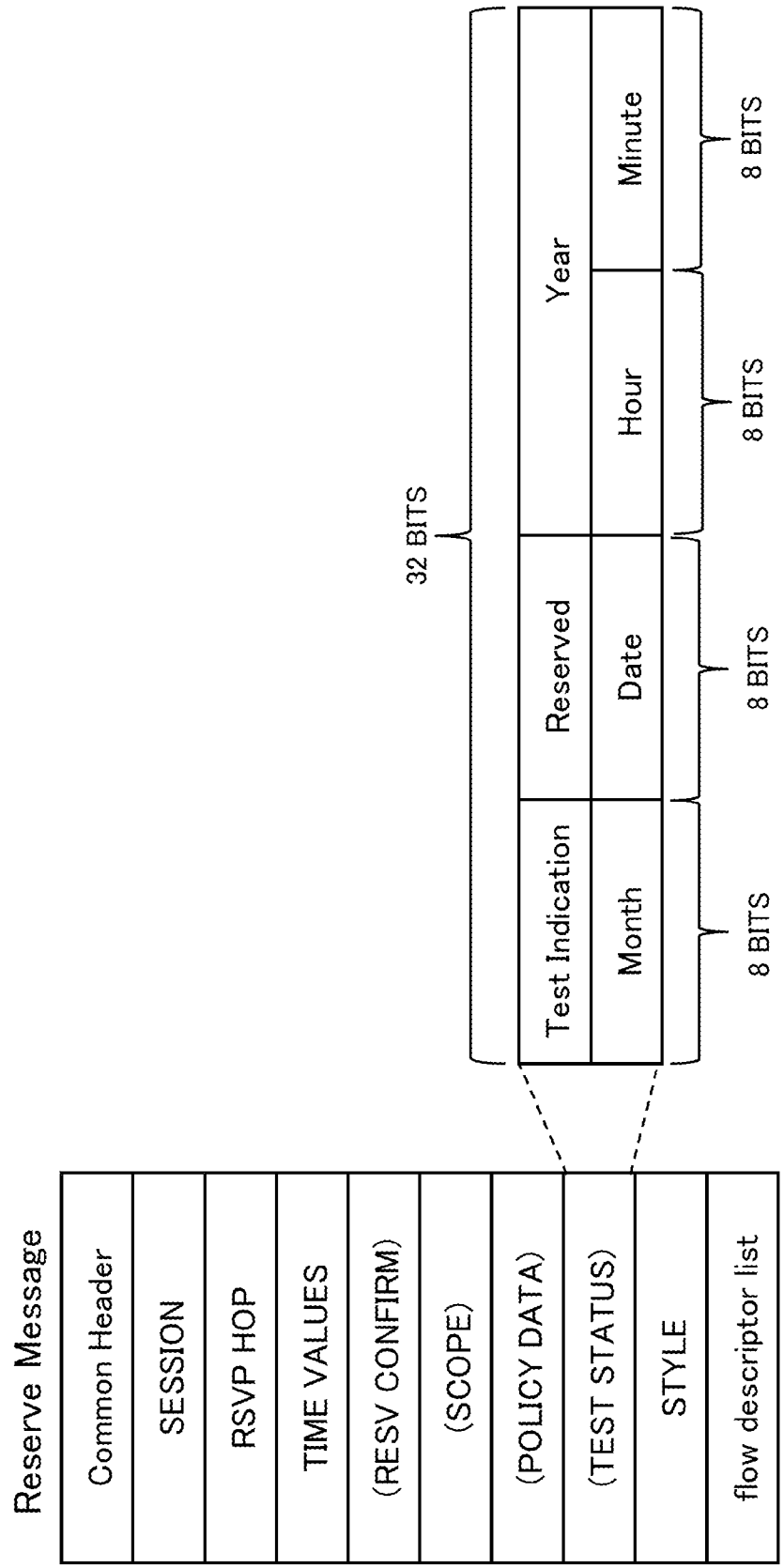
FIG. 28 is a diagram illustrating an exemplary format of a reserved message used in the embodiment.

Similarly to the test path message, the "TEST STATUS" object may be newly defined for the test reserve message corresponding to a response to the test path message as illustrated in FIG. 28, for example. The flag information (Test Indication) of the test and/or the information indicative of the test execution date may be set to the "TEST STATUS" object.

The source node 2, the end node 2, and the intermediate node 2 of the protection path may store, for example, the information indicative of "During Testing" and the information indicative of "Date and time of previous test" of the attribute information for each test target path. Based on these sets of the attribute information, a conflict arbitration of the protection path test can be achieved.

The source node 2 transmits the test path message to the protection path (process P41), and monitors whether or not the test reserve message is received within a predetermined time period (process P42 and process P43).

When the test reserve message is received within the predetermined time period (Yes in process P43), the source node 2 may start transmitting of a test signal to the protection path to monitor a loopback signal of the test signal (process P44). The loopback signal is an example of a signal returned to the source node 2 by loopback control of the end node 2 which received the test signal as described later. The source node 2 may perform a diagnosis process (to be described later with reference to FIG. 20) of the test result based on the result of monitoring the loopback signal (process P45).

The source node 2 is available to measure a status (for example, path quality) of the protection path by monitoring the loopback signal of the test signal. A pseudo-random bit sequence (PRBS) is applicable to the test signal. The test signal may be generated, for example, by the test signal generator 231 illustrated in FIG. 6. The test signal may be superimposed (or mapped) to a main signal transmitted from the signal output unit 23.

Meanwhile, when the test reserve message is not received within the predetermined time period (No in process P43), the source node 2 may perform, for example, a retest process (to be described later with reference to FIG. 23) as an example of a test fail process (process P46).

The intermediate node 2 of the protection path may process a path message (for testing) and a reserve message (for testing) according to the IETF standard. In other words, the intermediate node 2 may determine (or identify) the next hop 2 based on the identifier of a destination node 2 set in the message to transmit the received message to the identified next hop.

Figure 18:
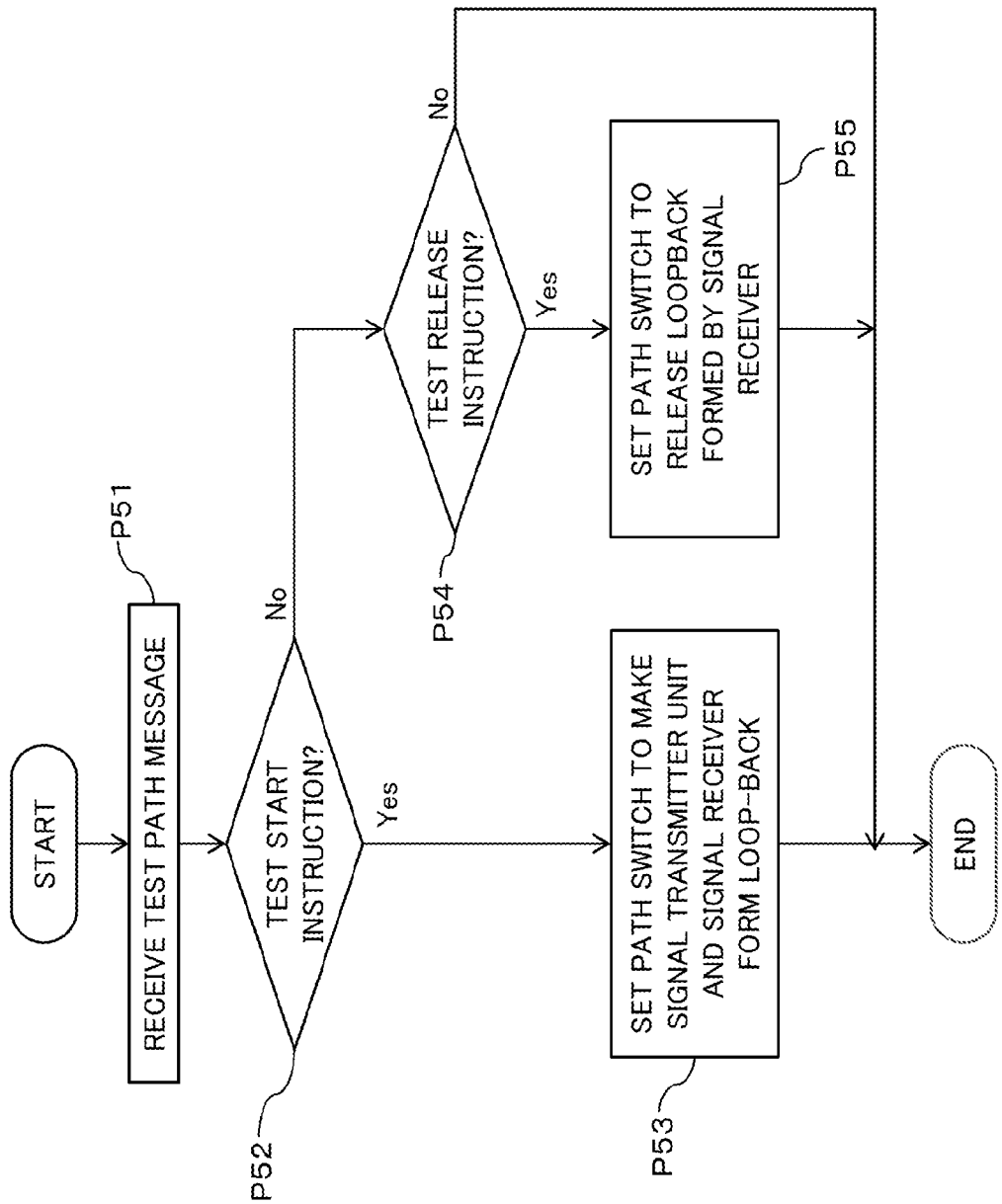
FIG. 18 is a flowchart for describing an example of a test process for the protection path in an end node of the protection path according to the embodiment.

The end node 2 may perform the loopback control of the received test signal according to an instruction of the source node 2. An example of the loopback control is illustrated in FIG. 18. The loopback control illustrated in FIG. 18 may be performed by the controller 26 illustrated in FIG. 7.

Upon receiving the test path message (process P51), the end node 2 determines whether or not the test start instruction is set in the received path message (process P52). When the test start instruction is set (Yes in process P52), the end node 2 sets (or controls) the path switch 22 to form a loop-back connection between the signal transmitter 23 and the signal receiver 21 which are subjected to the path setting (the resource reservation setting) of the test target (process P53).

Meanwhile, when the test start instruction is not set in the received message (No in process P52), the end node 2 further determines whether or not the test end instruction is set in the message (process P54). The message including the test end instruction may be called a path tear message.

When the received message is the path tear message (Yes in process P54), the end node 2 may release the loop-back setting of the path switch 22 (process P55). Meanwhile, when the received path message is not the path tear message (No in process P54), the end node 2 may terminate the process.

The intermediate node 2 and the source node 2 which have received the test reserve message recognize that the target path is the protection path under the test, and perform the path setting (the resource reservation setting) while making control not to issue an unnecessary alarm.

Figure 19:
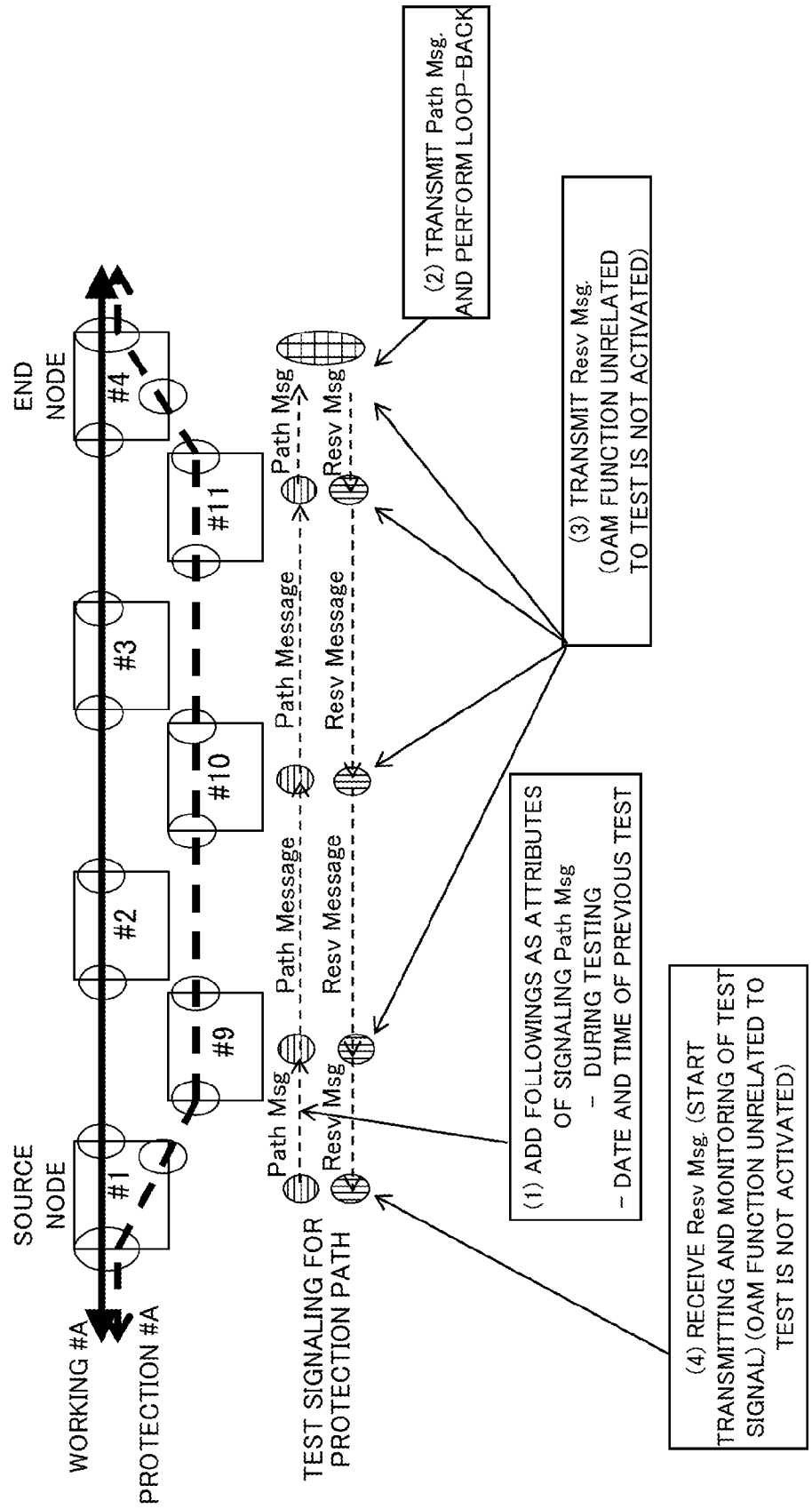
FIG. 19 is a diagram for describing an example of a test process for the protection path according to the embodiment.

For example, as illustrated in (3) and (4) of FIG. 19, the intermediate node 2 and the source node 2 which have received the test reserve message do not activate an OAM function unrelated to the protection path test. (1) and (2) depicted in FIG. 19 correspond to process P41 at the source node 2 illustrated in FIG. 17 and process P53 at the end node 2 illustrated in FIG. 18, respectively.

(Test Result Diagnosis Process)

Figure 20:
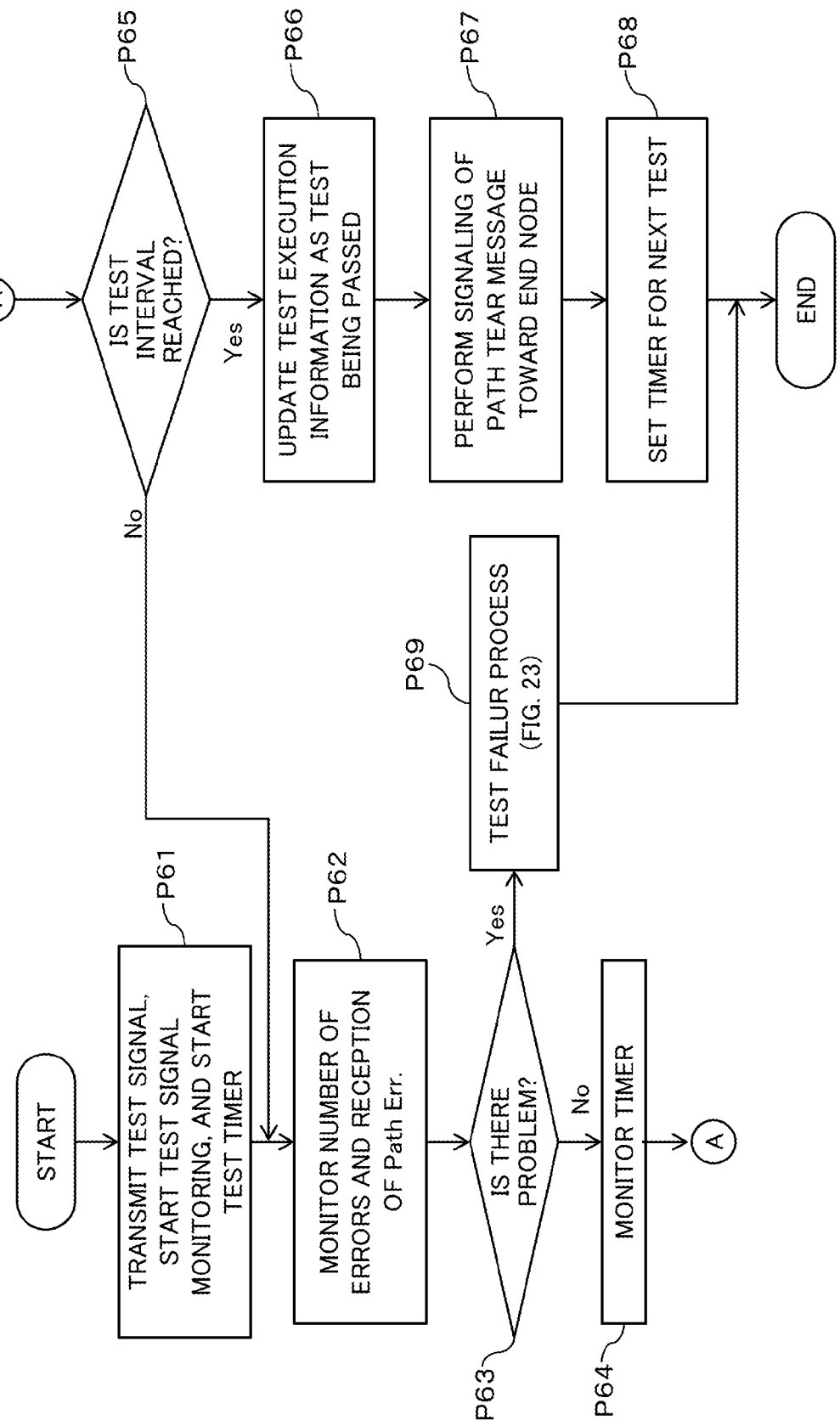
FIG. 20 is a flowchart for describing an example a test result diagnosis process illustrated in FIG. 17.

The source node 2 may perform a process illustrated in the flowchart of FIG. 20 as an example of a test result diagnosis process (P45) illustrated in FIG. 17. The test result diagnosis process illustrated in FIG. 20 may be performed by the controller 26 illustrated in FIG. 7.

For example, the source node 2 transmits the test signal such as a PRBS to the test target of the protection path, and starts monitoring a signal loop-backed from the end node 2 of the protection path (process P61). At this time, the source node 2 may start counting a predetermined test period by a test period timer. The test period timer may be achieved as a function of the apparatus controller 24 or the GMPLS controller 25.

In the monitoring of the loopback signal, parameters indicative of the number of errors, a path error, and path status such as an apparatus failure and a disconnection of an optical fiber may be monitored (process P62). As long as there is no problem in the parameters (No in process P63), the source node 2 continues monitoring the loopback signal until the test period timer is expired (process P64 to Yes in process P65). When there is a problem in any of the parameters during the monitoring (Yes in process P63), the source node 2 may perform the test fail process (the retest) to be described later with reference to FIG. 23 (process P69).

When the test period timer is expired without occurring any problems in the parameters (Yes in process P65) and when the number of errors during the monitoring is equal to or less than a predetermined reference value, the source node 2 may determine that there is no problem in the protection path (test pass). Upon determining that the test is passed, the source node 2 may update, for example, the test execution information stored in the storage 262 with the date information at the time when the test pass determination is made (process P66). Meanwhile, when the test period timer is not expired (No in process P65), the source node 2 returns to process P62 and the subsequent processes.

Thereafter, the source node 2 may perform a test ending process of the protection path (process P67), and may set the test activation timer to define the activation timing of the next test (process P68). In the test ending process (P67), the source node 2 may generate the path tear message set with test release flag information and transmit (signal) the path tear message through the test-completed protection path (see (1) of FIG. 21).

Figure 21:
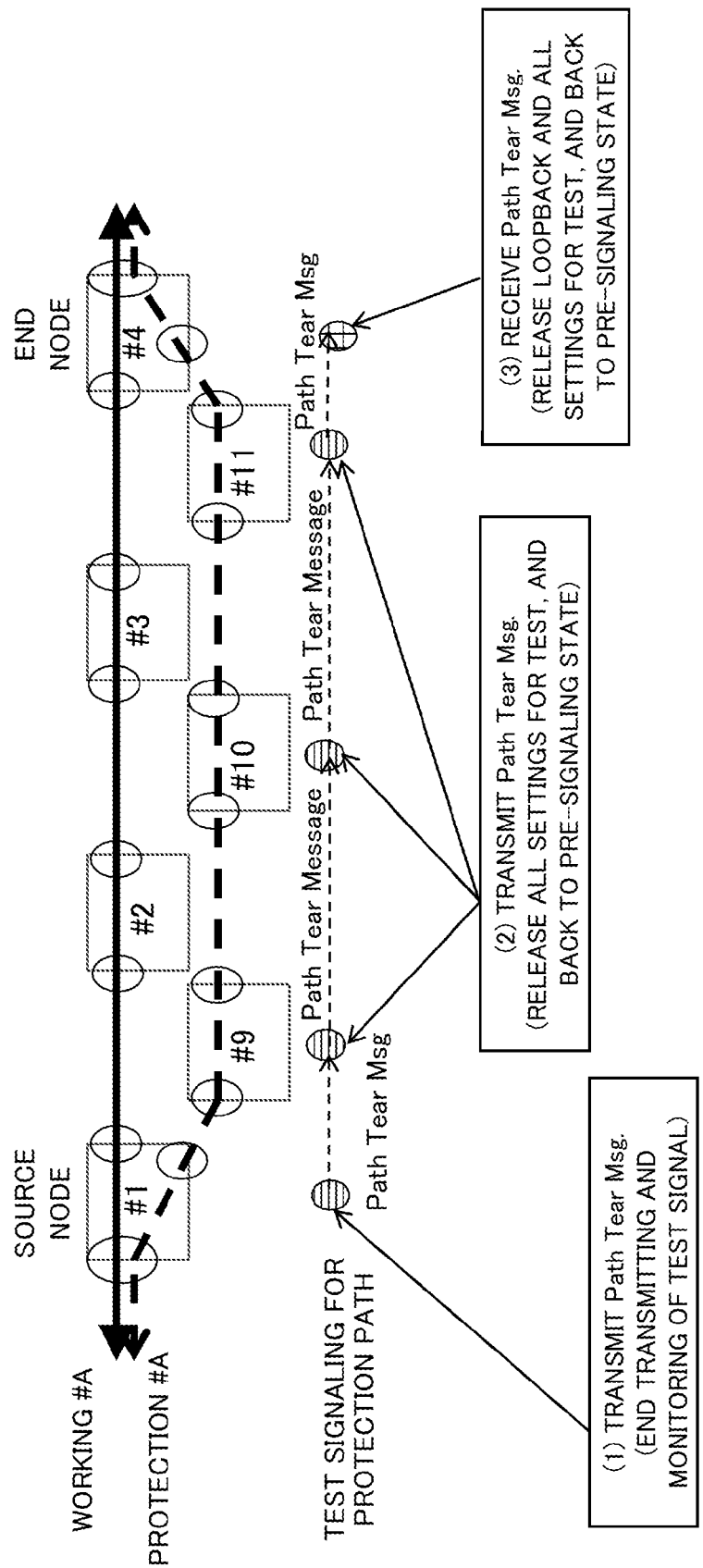
FIG. 21 is a flowchart for describing an example a test termination process for the protection path according to the embodiment.

Upon receiving the path tear message, the intermediate node 2 and the end node 2 of the protection path may release the settings for the test to recover the node state back to the pre-signaling state (see (2) and (3) of FIG. 21).

(Conflict Arbitration of Protection Path Test)

During the test of the protection path, a conflict may occur. As a non-limiting example, the following three cases may be considered.

Figure 22:
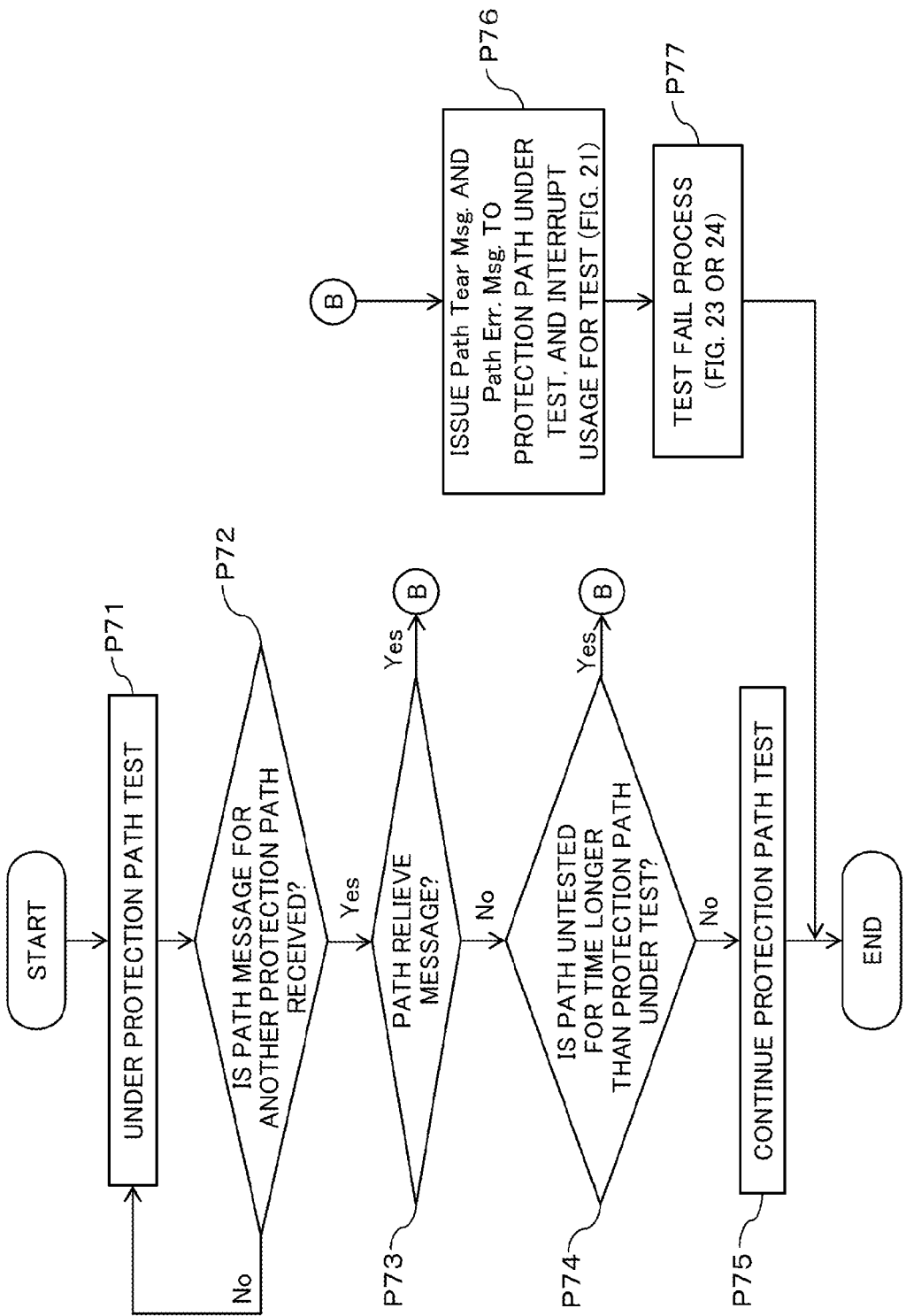
FIG. 22 is a flowchart for describing an arbitration process in a case where a conflict occurs in test processes for the protection path according to the embodiment.

(1) A case where a plurality of protection paths are selected as test targets in the same span (2) A case where a signaling process for relieving the working path is to be executed because a failure occurs in the working path which reserves the usage of a certain protection path during the test of the protection path (3) A case where the protection path of the test target is already used as the protection path for relieving another working path An example of the conflict arbitration in the above cases (1) and (2) is illustrated in FIG. 22. The conflict arbitration illustrated in FIG. 22 may autonomously be performed at the respective source, intermediate, and end nodes 2 of the protection path. The conflict arbitration may be performed, for example, by the test processor 265 of the controller 26 illustrated in FIG. 7.

The source, intermediate, and end nodes 2 transition to the testing state of the protection path once the test starts. The state transition to the testing state of the protection path may occur (or may be triggered) by processing the test path message and the test reserve message.

The node 2 may monitor, during the testing state of the protection path (process P71), whether or not a path message for another protection path is received (No route of process P72). When the path message is received (Yes in process P72), the node 2 may further determine whether or not the received path message is a signaling for relieving the failure-occurred working path by the protection path under the test (process P73).

In a case where the received path message is the signaling for relieving the working path (Yes in process P73), the node 2 surrenders the protection path under the test to the failure-occurred working path (process P76).

For example, as illustrated in FIG. 21, the node 2 transmits the path tear message and the path error message to the protection path under the test to release the testing state of the protection path, and performs a process of making the node state back to the pre-signaling state. Similarly, the node 2 which has received the path tear message and the path error message may also release the testing state of the protection path. In response to the release of the testing state of the protection path, the node 2 may perform a setting process for the protection path to relieve the failure-occurred working path.

Meanwhile, in process P73, when the received path message is not the signaling for relieving the working path (No in process P73), the node 2 may further determine whether the received path message is the test path message and whether the protection path targeted by the test message is a path untested for a longer time than the protection path under the test (process P74). For example, based on the above-mentioned test execution information, it is possible to determine whether the protection path of a new test target is a path untested for a longer time than the protection path under the test.

When the protection path of the new test target is a path untested for a longer time than the protection path under the test (Yes in process P74), the node 2 surrenders the protection path under the test to the test for the protection path of the new test target (process P76). For example, the node 2 may transmit the path tear message and the path error message to the protection path under the test to release the testing state of the protection path, and may perform a process of making the node state back to the pre-signaling state. Similarly, the node 2 which has received the path tear message and the path error message may release the testing state of the protection path. In response to a release of the testing state of the protection path, the node 2 may perform the test setting on the protection path of the new test target.

As described above, in a case where the working path is to be relieved using the protection path under the test and/or in a case where another protection path left in an untested period longer than the protection path under the test is to be tested, the node 2 surrenders the protection path under the test to the working path for the relief thereof or to another protection path for the test.

In a case other than the above cases (No in processes P73 and P74), the node 2 may continue the test of the protection path (process P75).

The node 2 which has released the testing state of the protection path may perform the test fail process of the protection path as described with reference to FIG. 23 or 24 (process P77).

In the example described above, when the tests for the plurality of protection paths conflict with each other, the untested period is used as an example of a parameter (may also be referred to as a policy or a priority) for the conflict arbitration as described in process P74. However, the parameter to be used in the conflict arbitration is not limited thereto.

For example, the plurality of protection paths may be classified into groups and the groups may be ranked (given a priority) in advance. Then, the conflict arbitration may be performed by comparing the ranks of the groups.

By the way, in the third case among the above-described three cases, that is, the case where the protection path of the test target is already used as the protection path for relieving another working path, the relieving process is performed in preference to the test. Therefore, the path message of the protection path may be unprocessed in the node 2.

The node 2 where the conflict occurs in the above case may perform a process, for example, according to the operation defined in the GMPLS protocol of the IETF standard to send the path error message in response to the received test path message. The relay node 2 and the source node 2 which have received the path error message may recover the settings changed for the test of the protection path to the settings at the time when the pre-signaling is performed.

(Test Fail Process)

The source node 2 may perform a retest for the protection path on which the test is failed. The retest may be performed after a certain time period elapses from the test fail. The waiting time period until the retest starts may be a predetermined time period, or may be adaptively determined (or adjusted) based on the number of fails. For example, the waiting time period may be determined in consideration of the number of test fails by using an algorithm called "Truncated Binary Exponential Backoff" used in the Ethernet (registered trademark).

Figure 23:
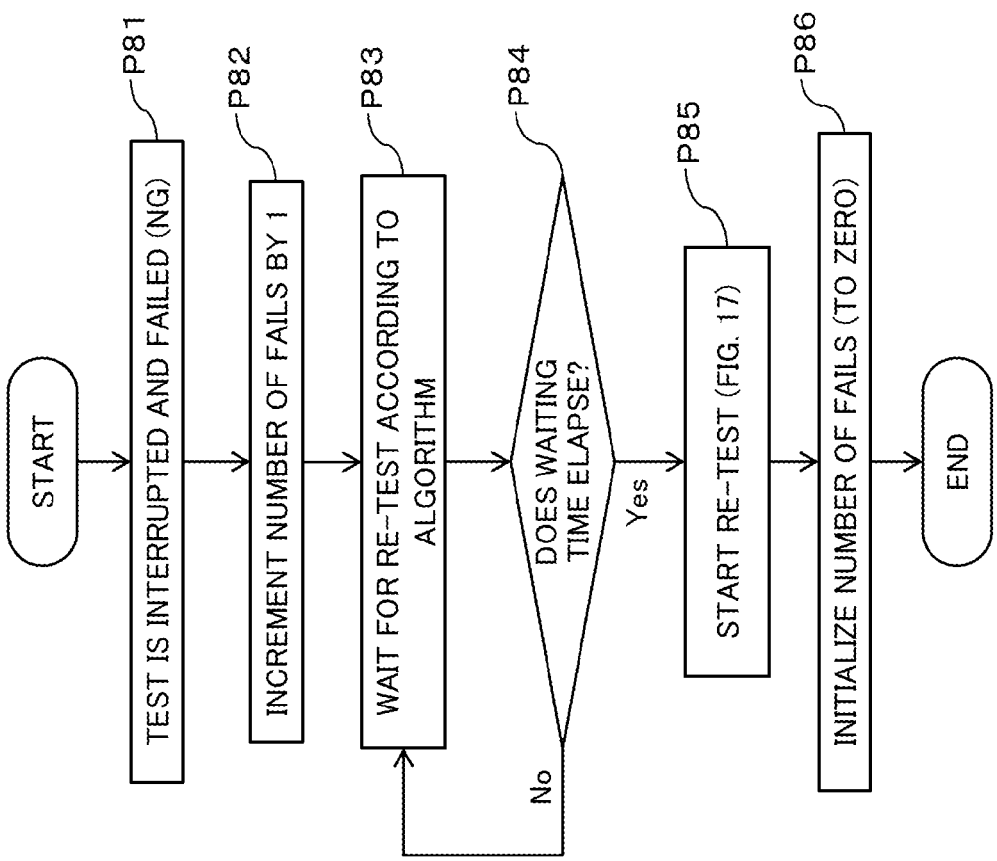
FIG. 23 is a flowchart for describing an example of a retesting process for the protection path in the source node of the protection path according to the embodiment.

FIG. 23 illustrates an example of a test fail process which includes a process of determining the waiting time period. The process illustrated in FIG. 23 may be performed, for example, by the controller 26 of the source node 2 (see FIG. 7).

As illustrated in FIG. 23, the source node 2 may count up a count value of a counter (not illustrated) by 1 (process P82)

in response to a release of the testing state of the protection path (process P81). An initial value of the counter value may be 0, for example.

Then, the source node 2 may determine the waiting time period until the retest starts, based on the count value of the number of test fails, according to the above algorithm to wait for the retest until the waiting time period elapses (process P83, and No route of process P84). When the waiting time period elapses (Yes in process P84), the source node 2 may perform the retest according to the process illustrated in FIG. 17 on the test-failed protection path (process P85), and may initialize the count value of the counter (process P86).

(Process of Resetting Protection Path)

In a case where it is determined that the protection path is in an unavailable state by the test of the protection path, the source node 2 may set an alternative protection path. The unavailable state of the protection path may be, for example, a state where it is determined that there is a problem (may include the failure occurrence of the protection path) in the soundness of the protection path by the protection path test, and may be a state where the protection path becomes unavailable for relieving another path.

For example, the source node 2 may perform a process of re-setting the protection path illustrated in the flowchart of FIG. 24. The process illustrated in FIG. 24 may be performed, for example, by the controller 26 of the source node 2 (see FIG. 7).

As illustrated in FIG. 24, when the source node 2 determines that the protection path is in the unavailable state as a result of the protection path test (process P91), the source node 2 may perform a route calculation of an alternative protection path (process P92).

Then, the source node 2 may perform the pre-signaling on a new protection path obtained by the route calculation as illustrated in FIG. 11 (process P93). When the pre-signaling is successfully performed (Yes in process P94), the source node 2 may transceive, for example, the path tear message for the protection path under the unavailable state as a result of the determination to release the setting of the protection path (process P95). Meanwhile, when the pre-signaling for the alternative protection path is failed (No in process P94), the source node 2 may repeatedly perform the route calculation of the alternative protection path until finding out the alternative protection path in which the pre-signaling is successfully performed (Yes determination in process P94).

As described above, according to the above-mentioned embodiment, in the SMN, it is possible to notify the failure occurred in the protection path which is in the pre-signaling state and is shared by the plurality of working paths to the relevant source and end nodes 2.

In other words, even in the SMN in which the source and end nodes 2 are not uniquely determined at the all times unlike the 1+1 or 1:1 protection, it is possible to notify the failure detected at the intermediate node 2 of the protection path to the source and end nodes 2 of the respective working paths which shares the protection path.

Therefore, the source and end nodes 2 is available to set a new protection path alternative for the failure-occurred protection path in response to the notification. Therefore, it is possible to prevent the situation that the source and end nodes 2 recognize the failure in the protection path after the failure occurs in the working path and the switching to the protection path. In other words, the source and end nodes 2 does not need to perform a useless operation such as the switching from the working path to the protection path which is unavailable because the failure has been occurred.

In addition, the source node 2 is available to test (or confirm) the soundness of the protection path which is pre-signaled and on standby (in other words, the path setting is not performed). Hence, it is possible to use only the protection path which is ensured the soundness for relieving the failure-occurred working path. In a case where there is a protection path of which the soundness is not confirmed as a result of the test, the source node 2 is available to set the alternative protection path. Therefore, it is possible to improve the reliability of the SMN.

In addition, even when the conflict with the test of another protection path occurs during the test of a certain protection path, the conflict is arbitrated. Hence, it is possible to suppress that an untested protection path occurs. Therefore, the respective protection paths can be reliably tested.

Further, during the test of the protection path, in a case where the failure in the working path having the usage reservation on the protection path occurs, the test of the protection path is arbitrated so that the process of relieving the working path is performed in preference to the test. Hence, the process of relieving the defective working path is not interrupted by the test of the protection path. Therefore, it is possible to reliably relieve the failure-occurred working path, and the reliability of the SMN can be improved.

In addition, in the above-mentioned embodiment, the failure notification process and the test process (which may include the above-mentioned conflict arbitration) of the protection path are performed on the source and end nodes 2 by using the GMPLS protocol. Hence, the load of these processes can be distributed onto the relevant nodes 2. Therefore, it is possible to avoid the increase in processing load and complexity caused in a case where these processes are intensively controlled by the NMS or the like.

As an aspect according to the above-mentioned embodiment, the reliability of the communication system can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication system comprising:
a source node and an end node of a working path; and
an intermediate node that is positioned in a protection path for the working path and that is set a usage reservation of the protection path,
wherein the intermediate node is configured to
extract identification information that is available to identify the source node and the end node and is contained in a signaling message, the signaling message being a message to reserve a usage of a resource in the protection path and being transmitted from the source node through the protection path to the end node to set a usage reservation to the protection path,
store the identification information extracted from the signaling message in a storage of the intermediate node, and notify, in response to a detection of a failure of the protection path, the failure to an address identified by the stored identification information.

2. The communication system according to claim 1, wherein
the protection path is a path shared by the working path serving as a first working path and a second working path, and
the intermediate node is configured to perform the store and the notification on the respective first and second working paths.

3. The communication system according to claim 1, wherein
the source node is configured to transmit to and receive from the end node a signal through the protection path being set the usage reservation to test the protection path.

4. The communication system according to claim 3, wherein
each of the nodes is configured to arbitrate a conflict between the test for the protection path serving as a first protection path and the test for a second protection path passing through the intermediate node, according to a predetermined policy.

5. The communication system according to claim 4, wherein
the policy gives test priority to one of the first and second protection paths, said one protection path being untested for a longer period than that of the other protection path.

6. The communication system according to claim 3, wherein
in response to a detection of a failure in the working path being set the usage-reserved protection path during the test for the usage-reserved protection path, each of the nodes stops the test for the usage-reserved protection path to perform a process of setting the usage-reserved protection path to a new working path.

7. The communication system according to claim 3, wherein
the test is performed by using a message of a GMPLS (Generalized Multi-protocol Label Switching) protocol.

8. A node that is positioned in a protection path for a working path, the node comprising:
a receiver configured to receive a signaling message that is a message to reserve a usage of a resource in the protection path and is transmitted from a source node of the working path through the protection path to an end node of the working path to set a usage reservation to the protection path;
a controller configured to extract identification information that is contained in the signaling message and is available to identify the source node and the end node;
a storage configured to store the identification information extracted from the signaling message,
wherein the controller is configured to notify, in response to a detection of a failure of the protection path, the failure to an address identified by the stored identification information.

9. The node according to claim 8, further comprising:
a processor configured to process a test signal to test the protection path, the test signal being transmitted between the source node and the end node through the protection path.

10. The node according to claim 9, wherein
the processor is configured to
arbitrate a conflict between the test signals to test a plurality of protection paths including the protection paths, according to a predetermined policy.

11. The node according to claim 10, wherein
the policy gives a test priority to a first protection path among the protection paths, the first protection path being untested for a longer period than that of a second protection path among the protection paths other than the first protection path.

12. The node according to claim 9, wherein
the processor is configured to
in response to a detection of a failure in the working path being prepared the usage-reserved protection path during the test for the usage-reserved protection path, stop the test for the usage-reserved protection path to perform a process of setting the usage-reserved protection path to a new working path.

* * * * *